(12) United States Patent
Irie et al.

(10) Patent No.: US 8,704,742 B2
(45) Date of Patent: Apr. 22, 2014

(54) LIQUID CRYSTAL DISPLAY DEVICE

(75) Inventors: Kentaro Irie, Osaka (JP); Masae Kawabata, Osaka (JP); Fumikazu Shimoshikiryoh, Osaka (JP); Hiroto Suzuki, Osaka (JP); Toshihide Tsubata, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 246 days.

(21) Appl. No.: 13/266,061

(22) PCT Filed: Apr. 16, 2010

(86) PCT No.: PCT/JP2010/002787
§ 371 (c)(1),
(2), (4) Date: Oct. 24, 2011

(87) PCT Pub. No.: WO2010/122753
PCT Pub. Date: Oct. 28, 2010

(65) Prior Publication Data
US 2012/0044427 A1  Feb. 23, 2012

(30) Foreign Application Priority Data
Apr. 24, 2009  (JP) .................................. 2009-106782

(51) Int. Cl.
G09G 3/36 (2006.01)
G06F 3/038 (2013.01)
G09G 5/00 (2006.01)
G09G 5/02 (2006.01)
G02F 1/1333 (2006.01)

(52) U.S. Cl.
USPC ............... 345/96; 345/209; 345/690; 345/89; 349/84

(58) Field of Classification Search
USPC .................. 345/204, 690, 695, 87–104, 209; 349/56–166
See application file for complete search history.

(56) References Cited

U.S. PATENT DOCUMENTS 4,792,857 A * 12/1988 Akiyama ...................... 348/793
5,640,174 A   6/1997 Kamei et al.
(Continued)

FOREIGN PATENT DOCUMENTS

| JP | 11-160731 | 6/1999 |
| JP | 2003-91017 | 3/2003 |
| JP | 2007-233336 | 9/2007 |

OTHER PUBLICATIONS

International Search Report mailed Jul. 13, 2010, directed to counterpart International Application No. PCT/JP2010/002787; 2 pages.

*Primary Examiner* — Ilana Spar
(74) *Attorney, Agent, or Firm* — Morrison & Foerster LLP

(57) ABSTRACT

When each of R, G, and B pixels continuously display identical gray scales (1023 gray scale) in a liquid crystal display device in which the thicknesses of the liquid crystal layers are of R pixel>G pixel>B pixel, the R pixel is alternately supplied with a positive signal potential (SHR1023) and a negative signal potential (SLR1023), the G pixel is alternately supplied with a positive signal potential (SHG1023) and a negative signal potential (SLG1023), and the B pixel is alternately supplied with a positive signal potential (SHB1023) and a negative signal potential (SLB1023). A first middle value (SMR1023) that between SHR1023 and SLR1023 is set higher than a second middle value (SMG1023) that is between SHG1023 and SLG1023, and second middle value (SMG1023) is set higher than a third middle value (SMB1023) that is between SHB1023 and SLB1023.

14 Claims, 17 Drawing Sheets

(56) References Cited

U.S. PATENT DOCUMENTS

| | | | |
|---|---|---|---|
| 6,278,427 B1 * | 8/2001 | Matsumoto et al. | 345/88 |
| 6,781,643 B1 * | 8/2004 | Watanabe et al. | 349/38 |
| 7,573,551 B2 * | 8/2009 | Koma et al. | 349/114 |
| 2007/0177085 A1 * | 8/2007 | Nishiyama et al. | 349/117 |
| 2009/0128752 A1 * | 5/2009 | Itou et al. | 349/106 |

* cited by examiner

| INPUT | OUTPUT (DAT) | | | | | |
|---|---|---|---|---|---|---|
| | R | | G | | B | |
| | H | L | H | L | H | L |
| 0 | 15 | 0 | 13 | 6 | 0 | 9 |
| . | . | . | . | . | . | . |
| . | . | . | . | . | . | . |
| 256 | 396 | 132 | 260 | 256 | 94 | 407 |
| . | . | . | . | . | . | . |
| . | . | . | . | . | . | . |
| 512 | 612 | 402 | 512 | 512 | 364 | 625 |
| . | . | . | . | . | . | . |
| . | . | . | . | . | . | . |
| 768 | 816 | 708 | 768 | 768 | 691 | 823 |
| . | . | . | . | . | . | . |
| . | . | . | . | . | . | . |
| 1023 | 1023 | 1015 | 1015 | 1016 | 1012 | 1023 |

| DAC | DAT | DAC OUTPUT |
|---|---|---|
| DAC100 | 15 | SHR0 |
| | 612 | SHR512 |
| | 1023 | SHR1023 |
| | 13 | SHG0 |
| | 512 | SHG512 |
| | 1015 | SHG1023 |
| | 0 | SHB0 |
| | 364 | SHB512 |
| | 1012 | SHB1023 |

| DAC | DAT | DAC OUTPUT |
|---|---|---|
| DAC101 | 0 | SLR0 |
| | 402 | SLR512 |
| | 1015 | SLR1023 |
| | 6 | SLG0 |
| | 512 | SLG512 |
| | 1016 | SLG1023 |
| | 9 | SLB0 |
| | 625 | SLB512 |
| | 1023 | SLB1023 |

| COLOR | R | | G | | B | |
|---|---|---|---|---|---|---|
| POL | H | L | H | L | H | L |
| DAC | 10R | 11R | 12G | 13G | 14B | 16B |
| DAT | 0 | SHR0 | SLR0 | SHG0 | SLG0 | SHB0 | SLB0 |
| | 512 | SHR512 | SLR512 | SHG512 | SLG512 | SHB512 | SLB512 |
| | 1023 | SHR1023 | SLR1023 | SHG1023 | SLG1023 | SHB1023 | SLB1023 |

LIQUID CRYSTAL DISPLAY DEVICE

REFERENCE TO RELATED APPLICATIONS

This application is a national stage application under 35 USC 371 of International Application No. PCT/JP2010/002787, filed Apr. 16, 2010, which claims the priority of Japanese Patent Application No. 2009-106782, filed Apr. 24, 2009, the contents of both of which prior applications are incorporated herein by reference.

TECHNICAL FIELD

The present invention relates to a multigap-structured liquid crystal display device.

BACKGROUND ART

Liquid crystal display devices include pixels corresponding to for example R (red), G (green), and B (blue), respectively. In a liquid crystal display device of a monogap structure which has a uniform liquid crystal layer thickness, coloring occurs at an oblique viewing angle particularly in black display (for example, bluish black), caused by wavelength dependence in retardation of a liquid crystal layer. So that this coloring is reduced in degree, brightness characteristics (gamma curve) against gray scale are set per R, G, and B pixels, however this causes a decrease in contrast due to a change in the brightness of black from a front view perspective. In view of this, a multigap structure has been suggested as a method which allows for reducing such a coloring while maintaining its contrast: the multigap structure changes a thickness of the liquid crystal layer per R, G, and B pixels, to compensate the wavelength dependence in retardation (for example, see Patent Literature 1).

It is known that in the liquid crystal display device, a parasitic capacitor Cgd is formed between the drain electrode of the transistor (and pixel electrode electrically connected to the drain electrode) and the scanning signal line, and a parasitic capacitor Csd is formed between the drain electrode of the transistor (and pixel electrode electrically connected to the drain electrode) and a source electrode of the transistor (and the data signal line electrically connected to the source electrode), as illustrated in FIG. 16. Caused by these parasitic capacitors, electric potential of the pixels (pixel electrodes) decrease when the transistor turns OFF (when the scanning signal is deactivated). This amount (absolute value) of decrease in the electric potential is called a feed-through voltage ($\Delta Q$), and S−$\Delta Q$ denotes an effective electric potential on the pixel where S is a signal potential applied on a pixel (hereinafter, an absolute value of the effective potential in accordance with electric potential Vcom of a common electrode is referred to as "effective voltage"). Note that the feed-through voltage $\Delta Q = Cgd \times (VH-VL)/(Ccs+Csd+Cgd+Clc)$, where VH is an active electric potential of a scanning signal supplied to a scanning signal line, VL is an inactive electric potential, Clc is a liquid crystal capacitor, and Ccs is a storage (auxiliary) capacitor.

Hence, as illustrated in FIG. 21, while gray scale X is continuously displayed on the R pixel, the R pixel alternately receives a signal potential SHRX (at positive drive) and a signal potential SLRX (at negative drive), which sets the signal potential SHRX as an effective potential EHRX at the positive drive+$\Delta$Qx and sets the signal potential SLRX as an effective potential ELRX at the negative drive+$\Delta$Qx. Note that since a middle value of the effective potential EHRX at the positive drive and the effective potential ELRX at the negative drive is (EHRX+ELRX)/2={(SLRX+SHRX)/2}−$\Delta$Qx=Vcom (electric potential of the common electrode), a middle value SMRX of the signal potential SHRX and the signal potential SLRX is (SHRX+SLRX)/2, which is Vcom+$\Delta$Qx.

Moreover, as illustrated in FIG. 21, while the gray scale X is continuously displayed on the G pixel, the G pixel alternately receives a signal potential SHGX (at positive drive) and a signal potential SLGX (at negative drive), which sets the signal potential SHGX as an effective potential EHGX at the positive drive+$\Delta$Qx and sets the signal potential SLGX as an effective potential ELGX at the negative drive+$\Delta$Qx. Note that since a middle value of the effective potential EHGX at the positive drive and the effective potential ELGX at the negative drive is (EHGX+ELGX)/2={(SLGX+SHGX)/2}−$\Delta$Qx=Vcom (electric potential of the common electrode), a middle value SMGX of the signal potential SHGX and the signal potential SLGX is (SHGX+SLGX)/2, which is Vcom+$\Delta$Qx.

Moreover, as illustrated in FIG. 21, while the gray scale X is continuously displayed on the B pixel, the B pixel alternately receives a signal potential SHBX (at positive drive) and a signal potential SLBX (at negative drive), which sets the signal potential SHBX as an effective potential EHBX at positive drive+$\Delta$Qx and sets the signal potential SLBX as an effective potential ELBX at negative drive+$\Delta$Qx. Note that since a middle value of the effective potential EHBX at the positive drive and the effective potential ELBX at the negative drive is (EHBX+ELBX)/2={(SLBX+SHBX)/2}−$\Delta$Qx=Vcom (electric potential of the common electrode), a middle value SMBX of the signal potential SHBX and the signal potential SLBX is (SHBX+SLBX)/2, which is Vcom+$\Delta$Qx.

As such, while identical gray scales X are displayed on each of the R pixel, G pixel, and B pixel, the middle value SMRX of the signal potentials applied on the R pixel, the middle value SMGX of the signal potentials applied on the G pixel, and the middle value SMBX of the signal potentials applied on the B pixel coincide.

CITATION LIST

Patent Literature

Patent Literature 1
Japanese Patent Application Publication, Tokukai, No. 2007-233336 A (Publication Date: Sep. 13, 2007)

SUMMARY OF INVENTION

A liquid crystal display device of the present invention includes: a plurality of scanning signal lines; a plurality of data signal lines; a first pixel including a first liquid crystal layer; a second pixel including a second liquid crystal layer, the second liquid crystal layer having a thickness thinner than that of the first liquid crystal layer; and a third pixel including a third liquid crystal layer, the third liquid crystal layer having a thickness thinner than that of the second liquid crystal layer, a scanning signal line decreasing in electric potential at a time when that scanning signal line is made unselected from a selected state, while each of the first to third pixels display identical gray scales continuously for a predetermined period, the first pixel being supplied alternately with a first positive signal potential and a first negative signal potential, the second pixel being supplied alternately with a second positive signal potential and a second negative signal potential, and the third pixel being supplied alternately with a third positive signal potential and a third negative signal potential, and a first middle value being set more than a second middle value, and the second middle value being set more than a third middle value, the first middle value being a middle value (amplitude center) of the first positive signal potential and the first negative signal potential, the second middle value being a middle value (amplitude center) of the second positive signal potential and the second negative signal potential, and the third middle value being a middle value (amplitude center) of the third positive signal potential and the third negative signal potential.

In a multigap-structured liquid crystal display device in which the thickness of the first liquid crystal layer is thicker than the thickness of the second liquid crystal layer, and in which the thickness of the second liquid crystal layer is thicker than the thickness of the third liquid crystal layer, the liquid crystal capacitor of a third pixel is greater than the liquid crystal capacitor of a second pixel, which liquid crystal capacitor of the second pixel is greater than the liquid crystal capacitor of a first pixel. Accordingly, when identical gray scales are displayed on the first to third pixels, the feed-through voltage of the first pixel becomes greater than the feed-through voltage of the second pixel, which feed-through voltage of the second pixel is greater than the feed-through voltage of the third pixel. In view of this, by having a first middle value be greater than a second middle value, which second middle value is greater than a third middle value, difference in feed-through voltage between pixels can be compensated, thereby improving the problem of the image sticking of pixels and the like.

Advantageous Effects of Invention

According to the present invention, it is possible to easily compensate the difference in the feed-through voltage between pixels in the multigap-structured liquid crystal display device, thereby allowing for improving the problem of image sticking of pixels and the like.

DETAILED DESCRIPTION OF THE INVENTION

The present embodiment is as described below with reference to FIGS. 1 to 20. FIG. 2 is a block diagram illustrating a configuration of the present liquid crystal display device. As illustrated in FIG. 2, the present liquid crystal display device includes a display section (a VA mode liquid crystal panel having a negative-type liquid crystal layer) 60, a display control circuit 70, a gate driver 80, and a source driver 90. The display section (liquid crystal panel) 60 has data signal lines (15R, 15G, 15B), a scanning signal line 16, a red pixel (hereinafter, R pixel) PR, a green pixel (hereinafter, G pixel) PR, a blue pixel (hereinafter, B pixel) PB, and a storage capacitor wire (Cs wire not illustrated). The data signal line 15R is connected to the R pixel, the data signal line 15G is connected to the G pixel, and the data signal line 15B is connected to the B pixel.

The display control circuit 70 receives, from an external signal source (e.g. a tuner), a digital video signal Dv, a horizontal sync signal HSY, a vertical sync signal VSY, and a control signal Dc for controlling display operation. The display control circuit 70 generates a source start pulse signal SSP, a source clock signal SCK, a source polarity signal POL, an image data signal DAT (digital signal), a gate start pulse signal GSP, a gate clock signal GCK, and a gate driver output control signal GOE, based on the received signals (Dv, HSY, VSY, Dc). The display control circuit 70 thereafter outputs the source start pulse signal SSP, the source clock signal SCK, the source polarity signal POL, and the image data signal DAT to the source driver 90, and outputs the gate start pulse signal GSP, the gate clock signal GCK, and the gate driver output control signal GOE to the gate driver 80.

Moreover, the gate driver 80 drives the scanning signal line 16 based on the gate start pulse signal GSP, the gate clock signal GCK, and the gate driver output control signal GOE, and the source driver 90 drives the data signal lines (15R, 15G, 15B) based on the source start pulse signal SSP, the source clock signal SCK, and the image data signal DAT. More specifically, an analog signal potential corresponding to the image data signal DAT is supplied to the data signal lines (15R, 15G, 15B) at a timing specified by the source start pulse signal SSP, the source clock signal SCK, and the source polarity signal POL.

Figure 2:
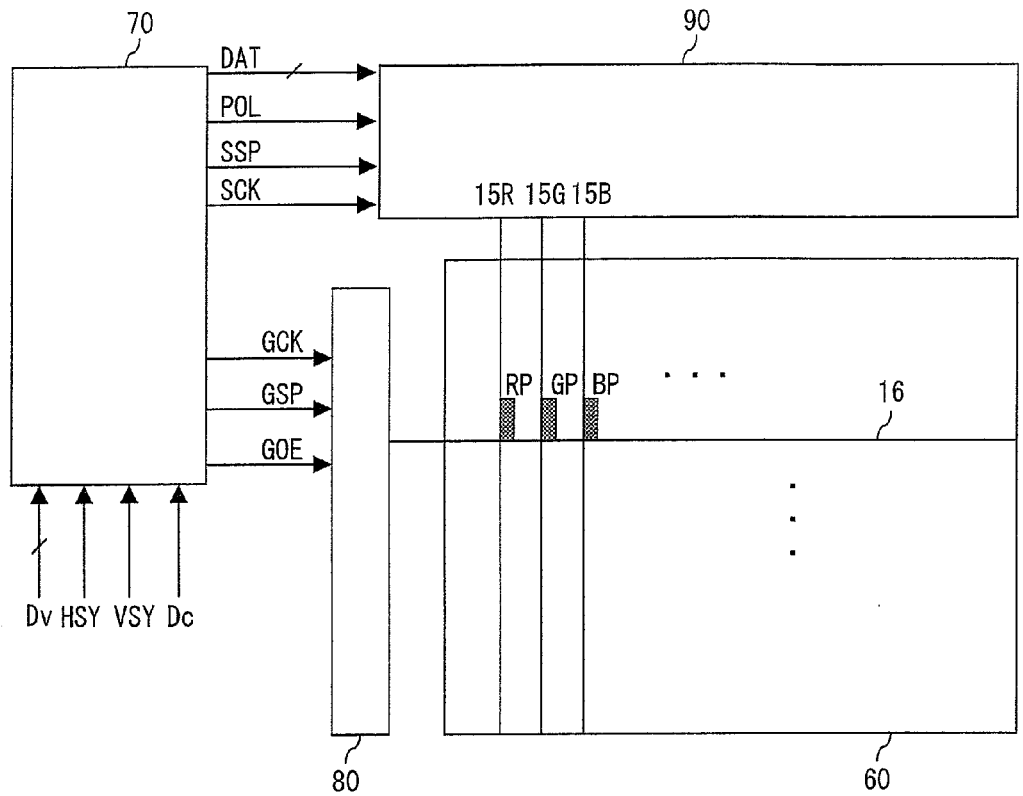
FIG. 2 is a block diagram illustrating a configuration of the present liquid crystal display device.
Figure 3:
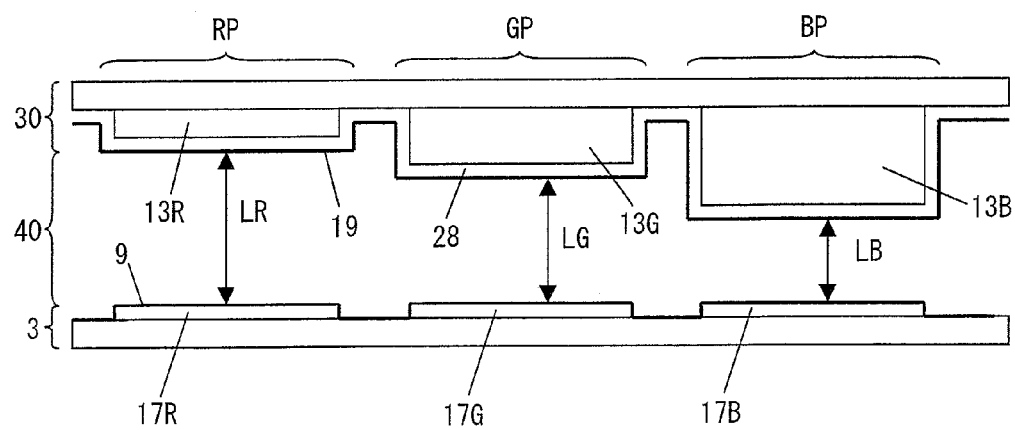
FIG. 3 is a cross sectional view illustrating a cross section (multigap structure) of a liquid crystal panel of the present liquid crystal display device.

FIG. 3 illustrates a cross section partially of the liquid crystal panel 60 of FIG. 2. As illustrated in FIG. 3, the liquid crystal panel 60 includes an active matrix substrate 3, a color filter substrate 30, and a liquid crystal layer 40 filled between these substrates. The active matrix substrate 3 has, formed thereon, data signal lines, scanning signal lines, various insulating films, transistors, and storage capacitor wires (these not illustrated), and further pixel electrodes 17R, 17G, 17B and an alignment film 9 covering these pixel electrodes. Meanwhile, the color filter substrate has, formed thereon, color filters 13R, 13G, and 13B corresponding to the pixel electrodes 17R, 17G, and 17B, respectively, a counter electrode 28 covering these color filters, and an alignment film 19 covering the counter electrode 28. The R pixel PR is configured so as to include the pixel electrode 17R, the counter electrode 28, and a liquid crystal layer LR sandwiched between the pixel electrode 17R and the counter electrode 28, the G pixel PG is configured so as to include the pixel electrode 17G, the counter electrode 28, and a liquid crystal layer LG sandwiched between the pixel electrode 17G and the counter electrode 28, and the B pixel PB is configured so as to include the pixel electrode 17B, the counter electrode 28, and a liquid crystal layer LB sandwiched between the pixel electrode 17B and the counter electrode 28.

In the embodiment, the present liquid crystal panel is of a multigap structure in which a thickness of the liquid crystal layer LR is thicker than a thickness of the liquid crystal layer LG, where the thickness of the liquid crystal layer LG is thicker than a thickness of the liquid crystal layer LB.

An advantage of the multigap structure is that wavelength dependence of retardation can be generally compensated by changing the thickness of the liquid crystal layers per R, G, and B pixels. Namely, a shift in a VT curve (curve of transmittance against effective voltage) of the R pixel from a VT curve of the G pixel and VT curve of the B pixel can be made smaller than that of a liquid crystal display device having a monogap structure (having uniform thickness of liquid crystal layers R, G, and B pixels). Generally with a VA mode liquid crystal display device having a monogap structure, transmittance is B pixel>G pixel>R pixel in halftone display, thus causing coloring of blue. However, with the multigap structure, such a coloring is prevented, thereby allowing for improvement in display quality.

Figure 15:
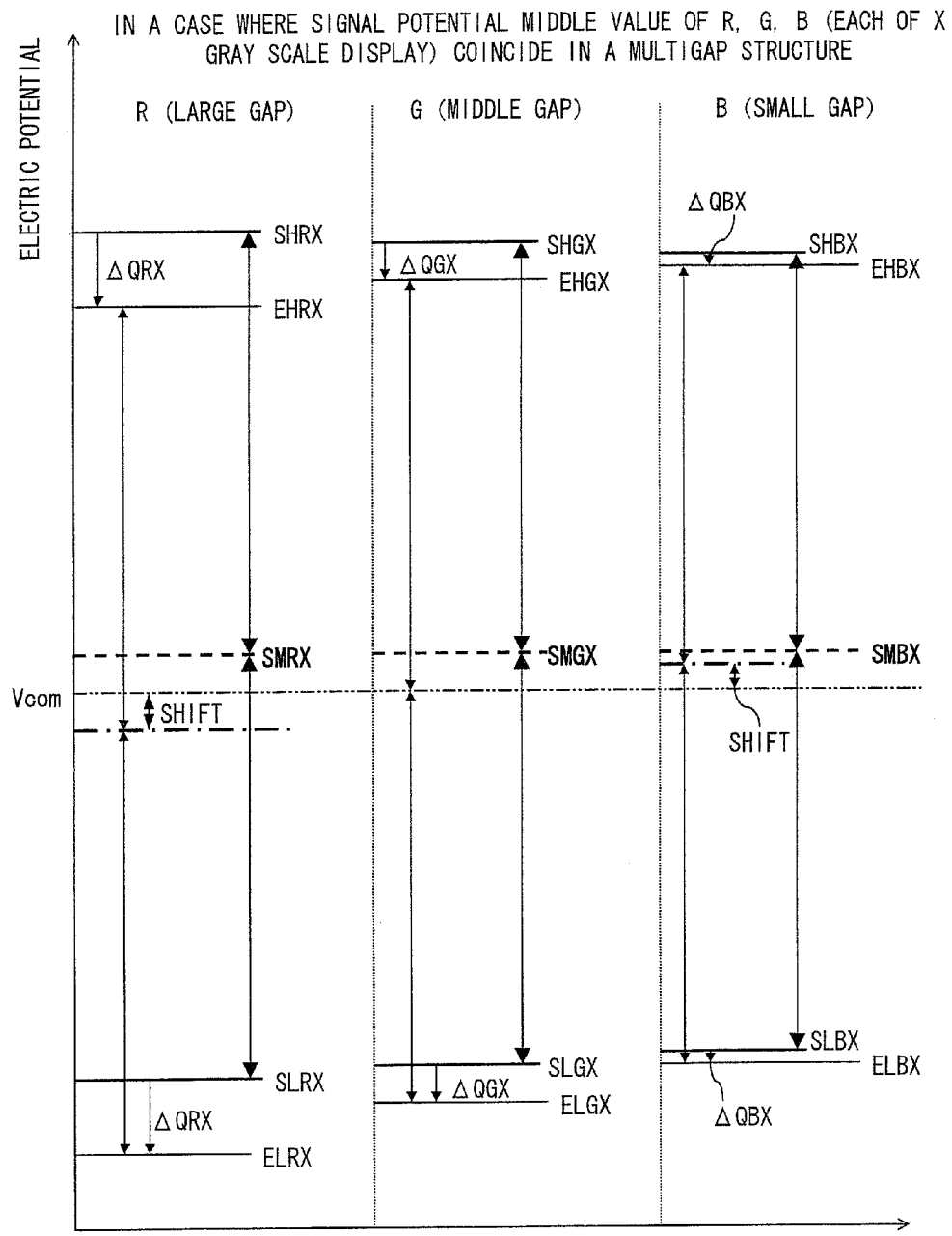
FIG. 15 is a schematic view illustrating a defect (counter potential shift) occurring when signal potential middle values of R, G, and B pixels coincide in a multigap structured liquid crystal display device.
Figure 16:
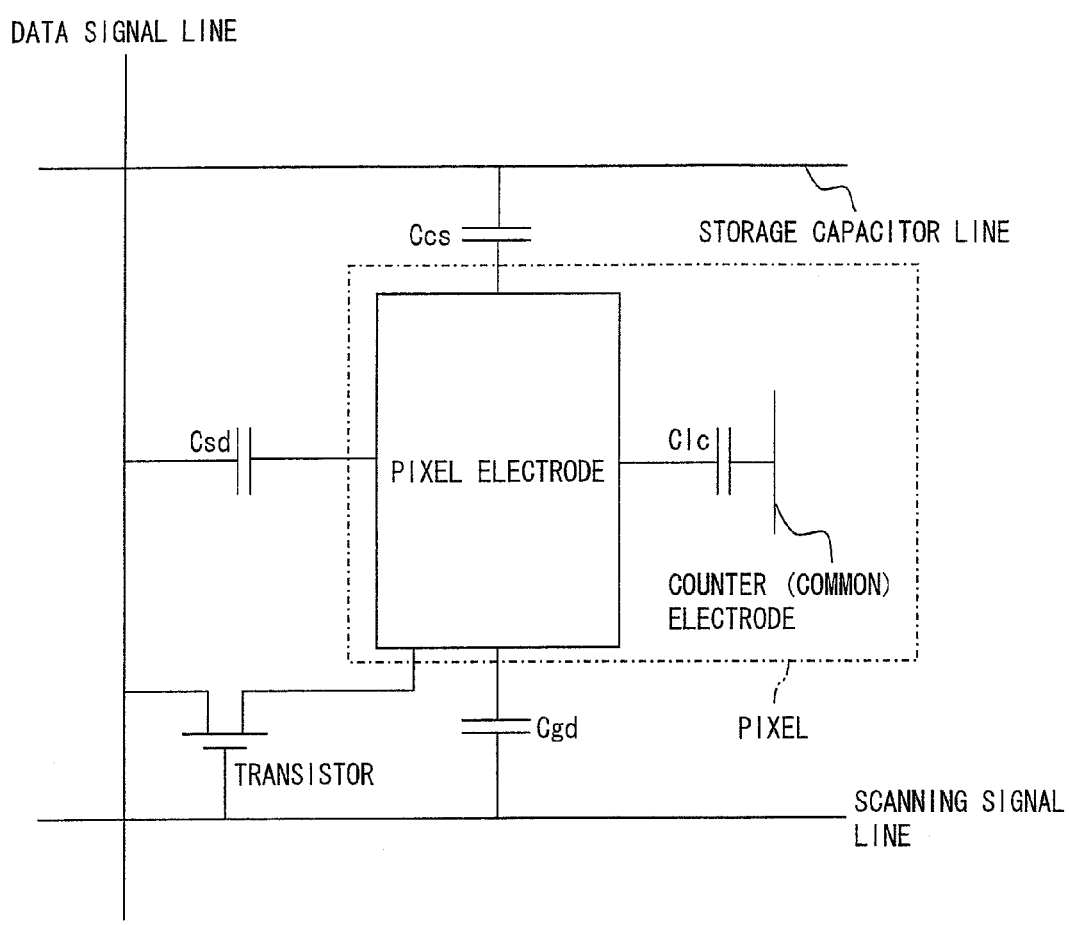
FIG. 16 is a circuit diagram describing a liquid crystal capacitor, a storage capacitor, and parasitic capacitors provided in a liquid crystal display device.

Although the multigap liquid crystal display device has such an advantage, the thickness of the liquid crystal layer of the R pixel is thicker than the thickness of the liquid crystal layer of the G pixel, which thickness of the liquid crystal layer of the G pixel is thicker than the thickness of the liquid crystal layer of the B pixel, namely the liquid crystal capacitor (Clc) of the B pixel is greater than the liquid crystal capacitor (Clc) of the G pixel, which liquid crystal capacitor (Clc) of the G pixel is greater than the liquid crystal capacitor (Clc) of the R pixel. This causes a feed-through voltage of the R pixels to be of a greater value than the feed-through voltage of the G pixels, which feed-through voltage of the G pixels is of a greater value than the feed-through voltage of the B pixels, even in a case where identical gray scales are displayed on the R pixels, G pixels, and B pixels. This is because the feed-through voltage $\Delta Q$ is represented as $Cgd \times (VH-VL)/(Ccs+Csd+Cgd+Clc)$. As a result, if the middle value SMRX of the signal potentials applied on the R pixels, the middle value SMGX of the signal potentials applied on the G pixels, and the middle value SMBX of the signal potentials applied on the B pixels coincide as in the conventional technique when the identical gray scale X is displayed on each of the R pixels, G pixels, and B pixels, the counter electric potential shifts between the R pixels and the B pixels as illustrated in FIG. 15, thereby causing image sticking of pixels and like defects.

Accordingly, in the present embodiment, the difference in the feed-through voltage between the R pixels, G pixels, and B pixels is compensated by setting the middle value SMRX of the signal potential applied on the R pixels to be greater than the middle value SMGX of the signal potential applied on the G pixels, which middle value SMGX of the signal potential applied on the G pixels is greater than the middle value SMBX of the signal potential applied on the B pixels, while the identical gray scale X is displayed on each of the R pixels, G pixels, B pixels of the multigap liquid crystal display device.

Figure 1:
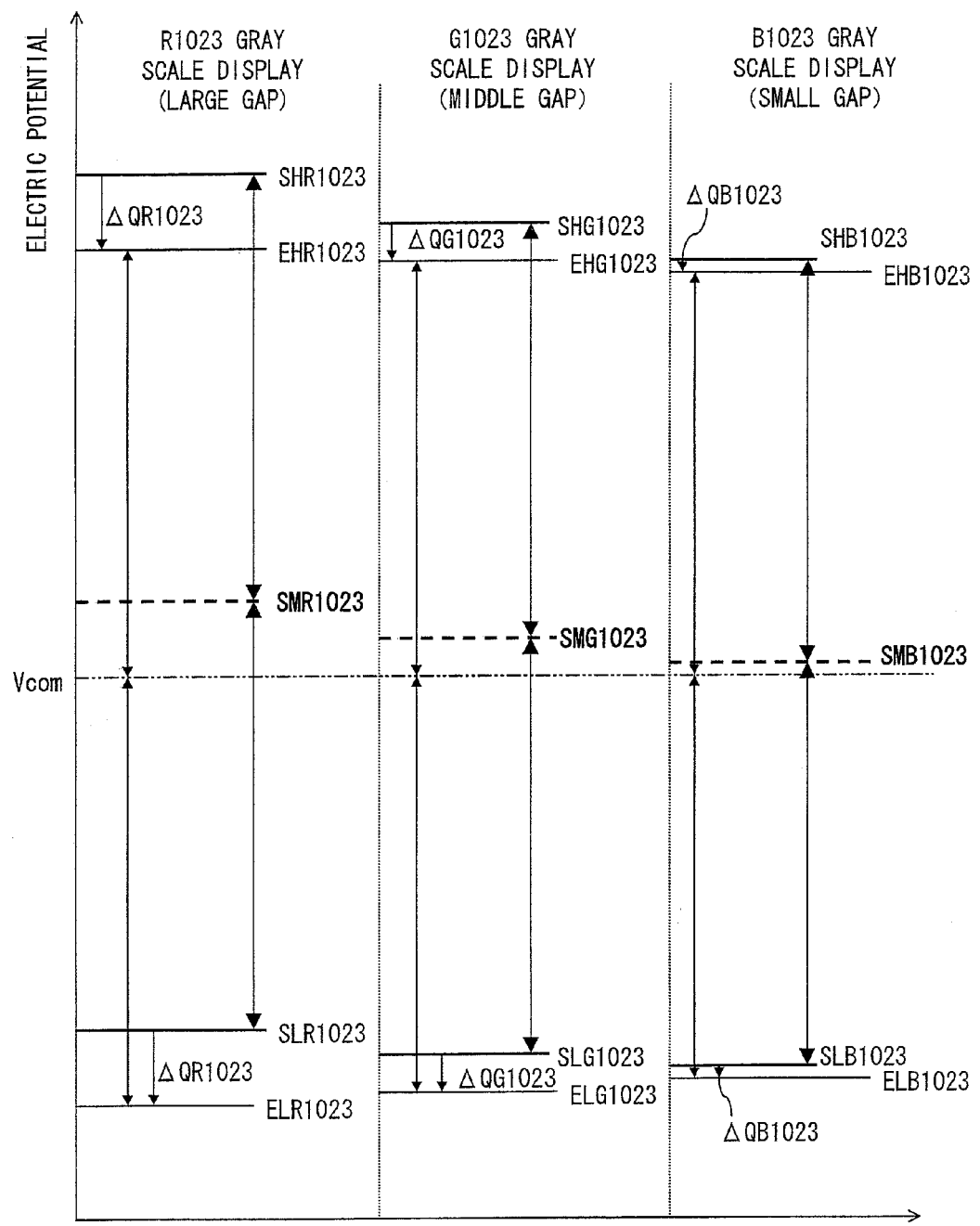
FIG. 1 is a schematic view illustrating a setting example of signal potentials (at 1023 gray scale=white gray scale display), with the present liquid crystal display device.

For example, when a highest gray scale (white gray scale) of 1023 gray scale is to be displayed, the following signal potentials are set as shown in FIG. 1 so that the feed-through voltage $\Delta$QR1023 of the R pixels becomes greater than the feed-through voltage $\Delta$QG1023 of the G pixels, which feed-through voltage $\Delta$QG1023 of the G pixels is greater than the feed-through voltage $\Delta$QB1023 of the B pixels: a positive signal potential SHR1023 applied on the R pixels; a negative signal potential SLR1023 applied on the R pixels; a middle value SMR1023 of SHR1023 and SLR1023; a positive signal potential SHG1023 applied on the G pixels; a negative signal potential SLG1023 applied on the G pixels; a middle value SMG1023 of SHG1023 and SLG1023; a positive signal potential SHB1023 applied on the B pixels; a negative signal potential SLB1023 applied on the B pixels; and a middle value SMB1023 of SHB1023 and SLB1023 (note that the effective electric potential that is optimum for R pixel 1023 gray scale display on the premise of the multigap structure in FIG. 1 is shown as EHR1023 and ELR1023, the effective potential that is optimum for G pixel 1023 gray scale display on the premise of the multigap structure is shown as EHG1023 and ELG1023, and the effective potential that is optimum for B pixel 1023 gray scale display on the premise of the multigap structure is shown as EHB1023 and ELB1023).

More specifically, in the R pixels, the positive signal potential SHR1023=the positive effective potential EHR1023+the feed-through voltage $\Delta$QR1023, the negative signal potential SLR1023=the negative effective potential ELR1023+the feed-through voltage $\Delta$QR1023, the counter electrode (common electrode) potential Vcom=a middle value of the positive and negative effective potentials=(EHR1023+ELR1023)/2, and the middle value SMR1023 of the positive and negative signal potentials=(SHR1023+SLR1023)/2=Vcom+$\Delta$QR1023. Moreover, in the G pixels, the positive signal potential SHG1023=the positive potential EHG1023+the feed-through voltage $\Delta$QG1023, the negative signal potential SLG1023=the negative effective potential ELG1023+the feed-through voltage $\Delta$QG1023, the counter electrode (common electrode) potential Vcom=a middle value of the positive and negative effective potentials=(EHG1023+ELG1023)/2, and the middle value SMG1023 of the positive and negative signal potentials=(SHG1023+SLG1023)/2=Vcom+$\Delta$QG1023. Moreover, in the B pixels, the positive signal potential SHB1023=the positive effective potential EHB1023+the feed-through voltage $\Delta$QB1023, the negative signal potential SLB1023=the negative effective potential ELB1023+the feed-through voltage ΔQB1023, the counter electrode (common electrode) potential Vcom=a middle value of the positive and negative effective potentials= (EHB1023+ELB1023)/2, and the middle value SMB1023 of positive and negative signal potentials=(SHB1023+ SLB1023)/2=Vcom+ΔQB1023.

Therefore, as illustrated in FIG. 1, SMR1023, a value adding ΔQR1023 to Vcom, is greater than SMG1023 that is a value adding ΔQG1023 to Vcom, which SMG1023 is greater than SMB1023 that is a value adding ΔQB1023 to Vcom.

Figure 4:
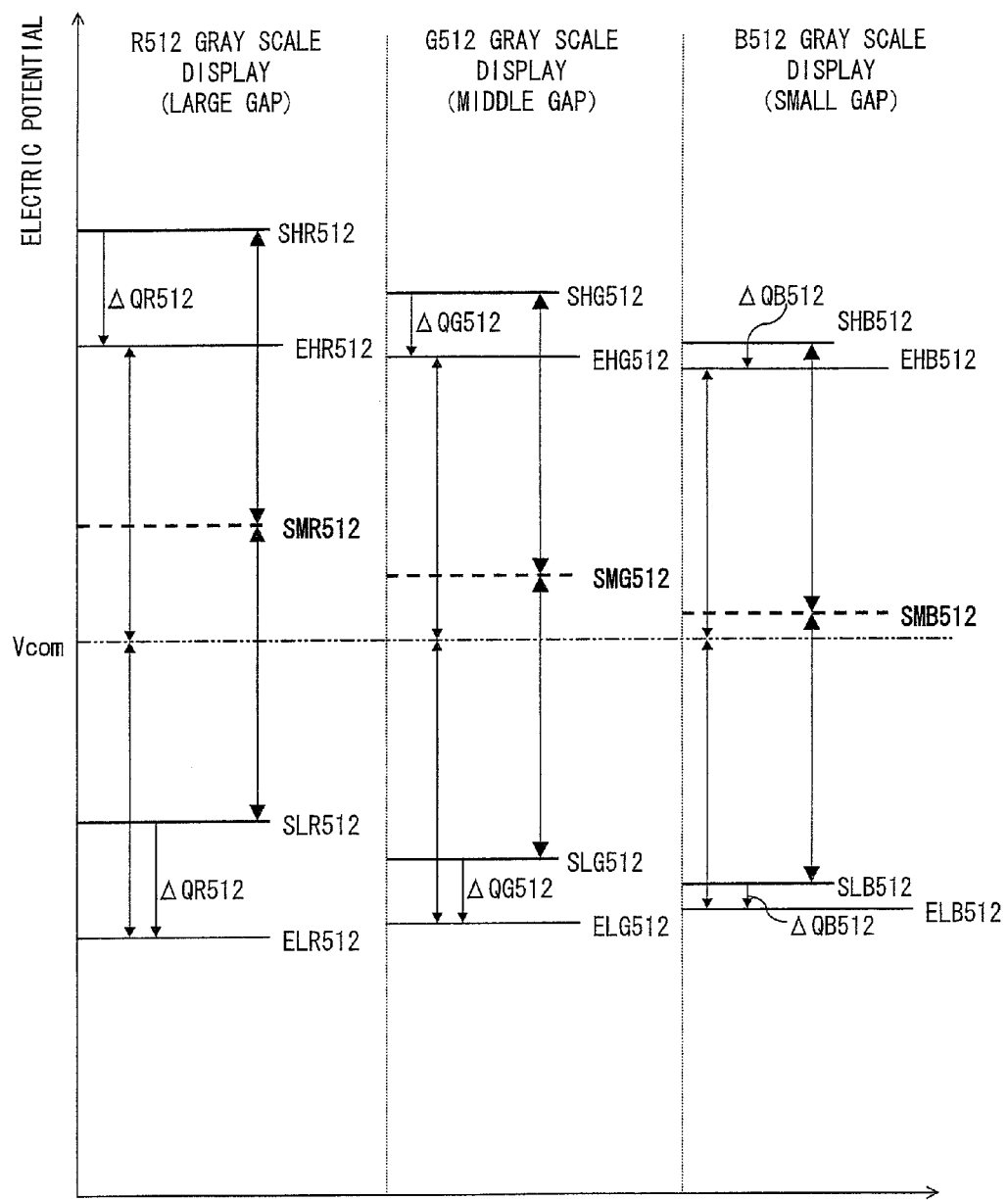
FIG. 4 is a schematic view illustrating a setting example of signal potentials (at 512 gray scale display), in the present liquid crystal display device.

Moreover, when 512 gray scale is to be displayed, which 512 gray scale is one intermediate gray scale, the following signal potentials are set as illustrated in FIG. 4, in consideration that a feed-through voltage ΔQR512 of the R pixel is to be greater than a feed-through voltage ΔQG512 of the G pixel, where feed-through voltage ΔQG512 of the G pixel is greater than a feed-through voltage ΔQB512 of the B pixel: a positive signal potential SHR512 applied on the R pixels; a negative signal potential SLR512 applied on the R pixels; a middle value SMR512 of SHR512 and SLR512; a positive signal potential SHG512 applied on the G pixels; a negative signal potential SLG512 applied on the G pixels; a middle value SMG512 of SHG512 and SLG512; a positive signal potential SHB512 applied on the B pixels; a negative signal potential SLB512 applied on the B pixels; and a middle value SMB512 of SHB512 and SLB512 (note that the effective potential which is optimum for R pixel 512 gray scale display on the premise of the multigap structure in FIG. 4 is shown as EHR512 and ELR512, the effective potential which is optimum for G pixel 512 gray scale display on the premise of the multigap structure is shown as EHG512 and ELG512, and the effective potential which is optimum for B pixel 512 gray scale display on the premise of the multigap structure is shown as EHB512 and ELB512).

More specifically, in the R pixels, the positive signal potential SHR512=the positive effective potential EHR512+the feed-through voltage ΔQR512, the negative signal potential SLR512=the negative effective potential ELR512+the feed-through voltage ΔQR512, the counter electrode (common electrode) potential Vcom=the middle value of the positive and negative effective potentials=(EHR512+ELR512)/2, and a middle value SMR512 of positive and negative signal potentials=(SHR512+SLR512)/2=Vcom+ΔQR512. Moreover, in the G pixels, the positive signal potential SHG512=the positive effective potential EHG512+the feed-through voltage ΔQG512, the negative signal potential SLG512=the negative effective potential ELG512+the feed-through voltage ΔQG512, the counter electrode (common electrode) potential Vcom=the middle value of positive and negative effective potentials=(EHG512+ELG512)/2, and a middle value SMG512 of positive and negative signal potentials= (SHG512+SLG512)/2=Vcom+ΔQG512. Moreover, in the B pixels, a positive signal potential SHB512=the positive effective potential EHB512+the feed-through voltage ΔQB512, a negative signal potential SLB512=the negative effective potential ELB512+the feed-through voltage ΔQB512, the counter electrode (common electrode) potential Vcom=the middle value of the positive and negative effective potentials= (EHB512+ELB512)/2, and a middle value SMB512 of the positive and negative signal potentials=(SHB512+SLB512)/ 2=Vcom+ΔQB512.

As a result, as illustrated in FIG. 4, SMR512, a value adding ΔQR512 to Vcom, is greater than SMG512 that is a value adding ΔQG512 to Vcom, where SMG512 is greater than SMB512 that is a value adding ΔQB512 to Vcom. Note that ΔQR1023 is smaller than ΔQR512, ΔQG1023 is smaller than ΔQG512, and ΔQB1023 is smaller than ΔQB512 (i.e. the feed-through voltage is greater in the 512 gray scale display as compared to that of the 1023 gray scale display). This is because with a VA mode (normally black) liquid crystal panel having a negative-type liquid crystal layer, as the displayed gray scale decreases (as the effective voltage applied on the liquid crystal layer is reduced), the liquid crystal capacitor Clc decreases.

Figure 5:
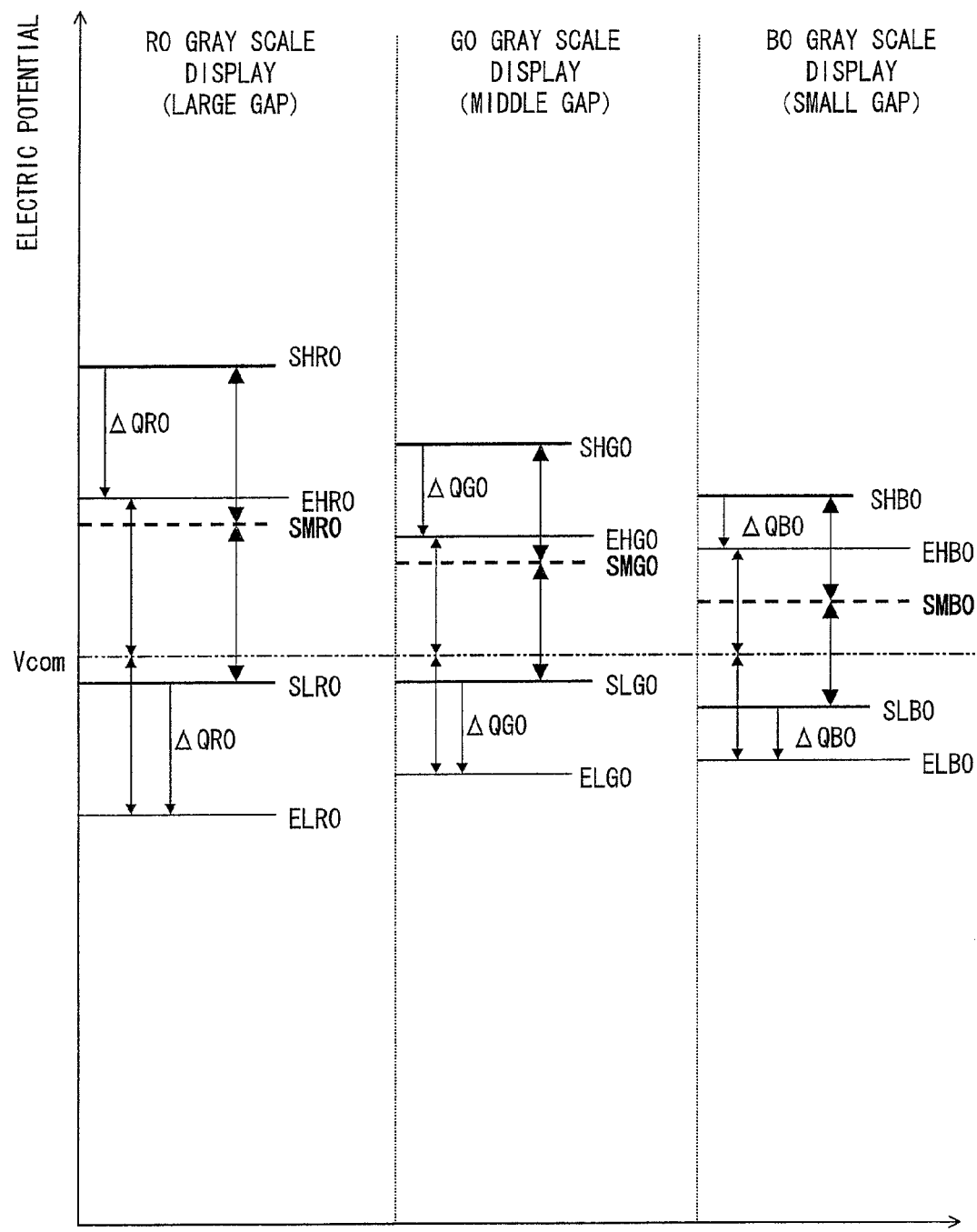
FIG. 5 is a schematic view illustrating a setting example of signal potentials (at 0 gray scale=black gray scale display), in the present liquid crystal display device.

When the lowest gray scale (black gray scale) of 0 gray scale is displayed, the following signal potentials are set as illustrated in FIG. 5, in consideration that the feed-through voltage ΔQR0 of the R pixels is to be greater than the feed-through voltage ΔQG0 of the G pixels, where the feed-through voltage ΔQG0 of the G pixels is greater than the feed-through voltage ΔQB0 of the B pixels: a positive signal potential SHR0 applied on the R pixels; a negative signal potential SLR0 applied on the R pixels; a middle value SMR0 of SHR0 and SLR0; a positive signal potential SHG0 applied on the G pixels; a negative signal potential SLG0 applied on the G pixels; a middle value SMG0 of SHG0 and SLG0; a positive signal potential SHB0 applied on the B pixels; a negative signal potential SLB0 applied on the B pixels; and a middle value SMB0 of SHB0 and SLB0 (note that the effective potential that is optimum for R pixel 0 gray scale display on the premise of the multigap structure in FIG. 5 is shown as EHR0 and ELR0, the effective potential that is optimum for G pixel 0 gray scale display on the premise of the multigap structure is shown as EHG0 and ELG0, and the effective potential that is optimum for the B pixel 0 gray scale display on the premise of the multigap structure is shown as EHB0 and ELB0).

More specifically, in the R pixels, the positive signal potential SHR0=the positive effective potential EHR0+the feed-through voltage ΔQR, the negative signal potential SLR0=the negative effective potential ELR0+the feed-through voltage ΔQR0, the counter electrode (common electrode) potential Vcom=a middle value of the positive and negative effective electric potentials=(EHR0+ELR0)/2, and the middle value SMR0 of positive and negative signal potentials=(SHR0+ SLR0)/2=Vcom+ΔQR0. Moreover, in the G pixels, the positive signal potential SHG0=the positive effective potential EHG0+the feed-through voltage ΔQG0, the negative signal potential SLG0=the negative effective potential ELG0+the feed-through voltage ΔQG0, the counter electrode (common electrode) potential Vcom=the middle value of positive and negative effective potentials=(EHG0+ELG0)/2, and the middle value SMG0 of the positive and negative signal potentials=(SHG0+SLG0)/2=Vcom+ΔQG0. Moreover, in the B pixels, the positive signal potential SHB0=the positive effective potential EHB0+the feed-through voltage ΔQB0, the negative signal potential SLB0=the negative effective potential ELB0+the feed-through voltage ΔQB, the counter electrode (common electrode) potential Vcom=the middle value of the positive and negative effective electric potentials= (EHB0+ELB0)/2, and the middle value SMB0 of the positive and negative signal potentials=(SHB0+SLB0)/2=Vcom+ ΔQB0.

Hence, as illustrated in FIG. 5, SMR0, a value adding ΔQR0 to Vcom, is greater than SMG0 that is a value adding ΔQG0 to Vcom, where SMG0 is greater than SMB0 that is a value adding ΔQB0 to Vcom. Note that ΔQR512 is smaller than ΔQR0, ΔQG512 is smaller than ΔQG0, and ΔQB512 is smaller than ΔQB0. This is because, as described above, in the VA mode (normally black) liquid crystal panel having the negative type liquid crystal layer, as the displayed gray scale decreases (as the effective voltage applied on the liquid crystal layer decreases), the liquid crystal capacitor Clc decreases.

Figure 6:
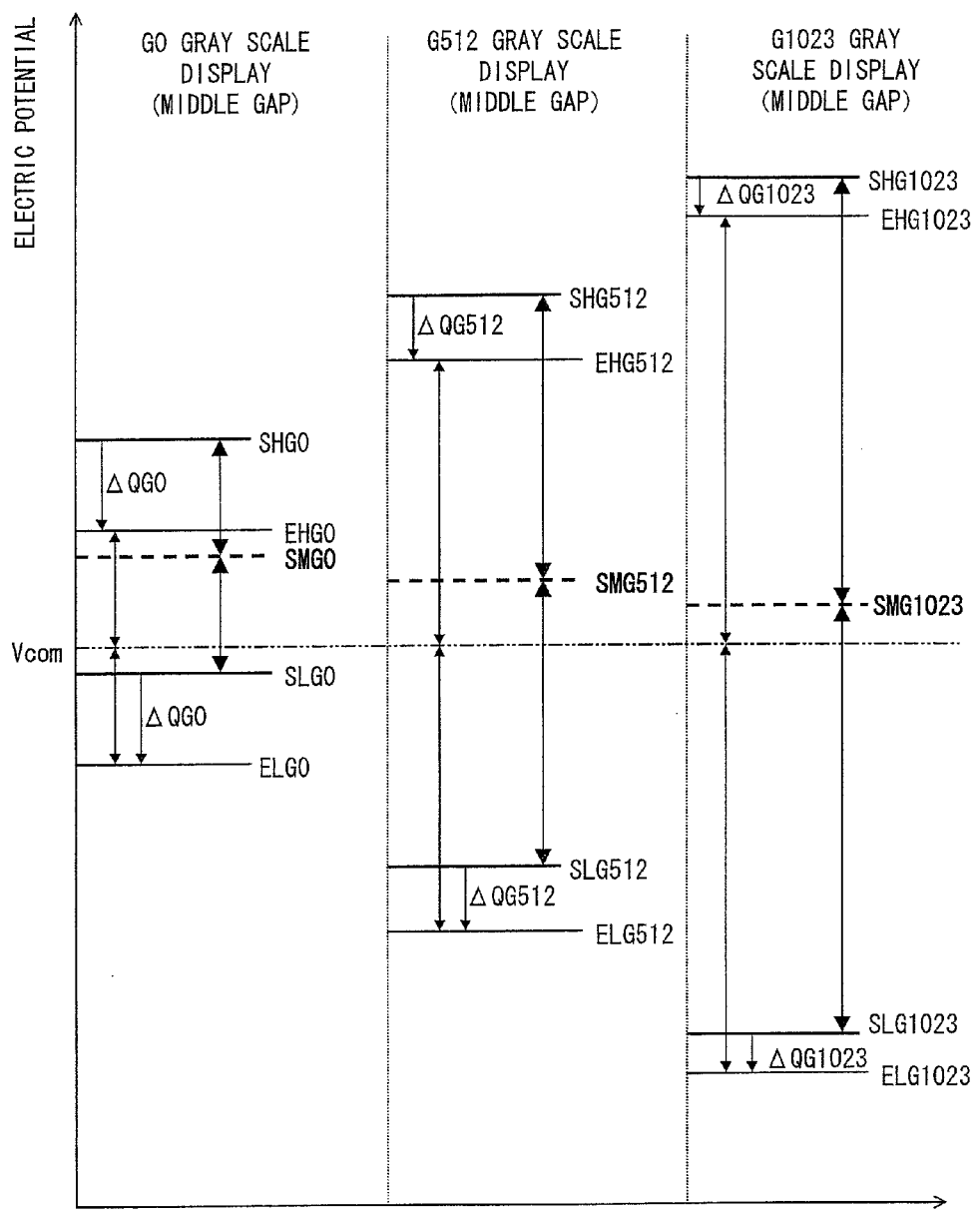
FIG. 6 is a schematic view illustrating a gray scale dependence (one example) of a signal potential middle value of the present liquid crystal display device.

FIG. 6 is a setting example of the following signal potentials when each of 0, 512, and 1023 gray scale is displayed on the R pixels: the feed-through voltage ΔQG0, the positive signal potential SHG0, the negative signal potential SLG0 applied on the G pixels, the middle value SMG0 of SHG0 and SLG0, the feed-through voltage ΔQG512, the positive signal potential SHG512, the negative signal potential SLG512 applied on the G pixels, the middle value SMG512 of SHG512 and SLG512, the feed-through voltage ΔQG1023, the positive signal potential SHG1023, the negative signal potential SLG1023 applied on the G pixels, and the middle value SMG1023 of SHG1023 and SLG1023. As illustrated in FIG. 6, as the displayed gray scale increases (as the effective voltage applied on the liquid crystal layer increases), the feed-through voltage decreases, and further the middle value of the positive and negative signal potentials decreases. This is because in the VA mode (normally black) liquid crystal panel having a negative type liquid crystal layer, as the displayed gray scale increases (as the effective voltage applied on the liquid crystal layer increases), the liquid crystal capacitor Clc increases.

In FIG. 1, the positive effective potentials (EHR1023, EHG1023, EHB1023) applied to the R, G, and B pixels, respectively, are of values which satisfy an inequality of EHR1023>EHG1023>EHB1023, and the negative effective potentials (ELR1023, ELG1023, ELB1023) applied to the R, G, and B pixels, respectively, are of values which satisfy an inequality of EHB1023>EHG1023>EHR1023. This is because, since it is difficult in view of actual processing to compensate the difference in retardation of the R, G, and B pixels just by the thickness of the liquid crystal layer (coincide the three VT curves corresponding to R, G, and B pixels, respectively), the three VT (transmittance against effective voltage) curves corresponding to respective R, G, B pixels are basically made to match each other by the multigap structure, while as a finishing stage, setting of the gamma curve (brightness characteristics against gray scale) is carried out per R, G, B pixels (so-called RGB independent gamma setting).

Figure 7:
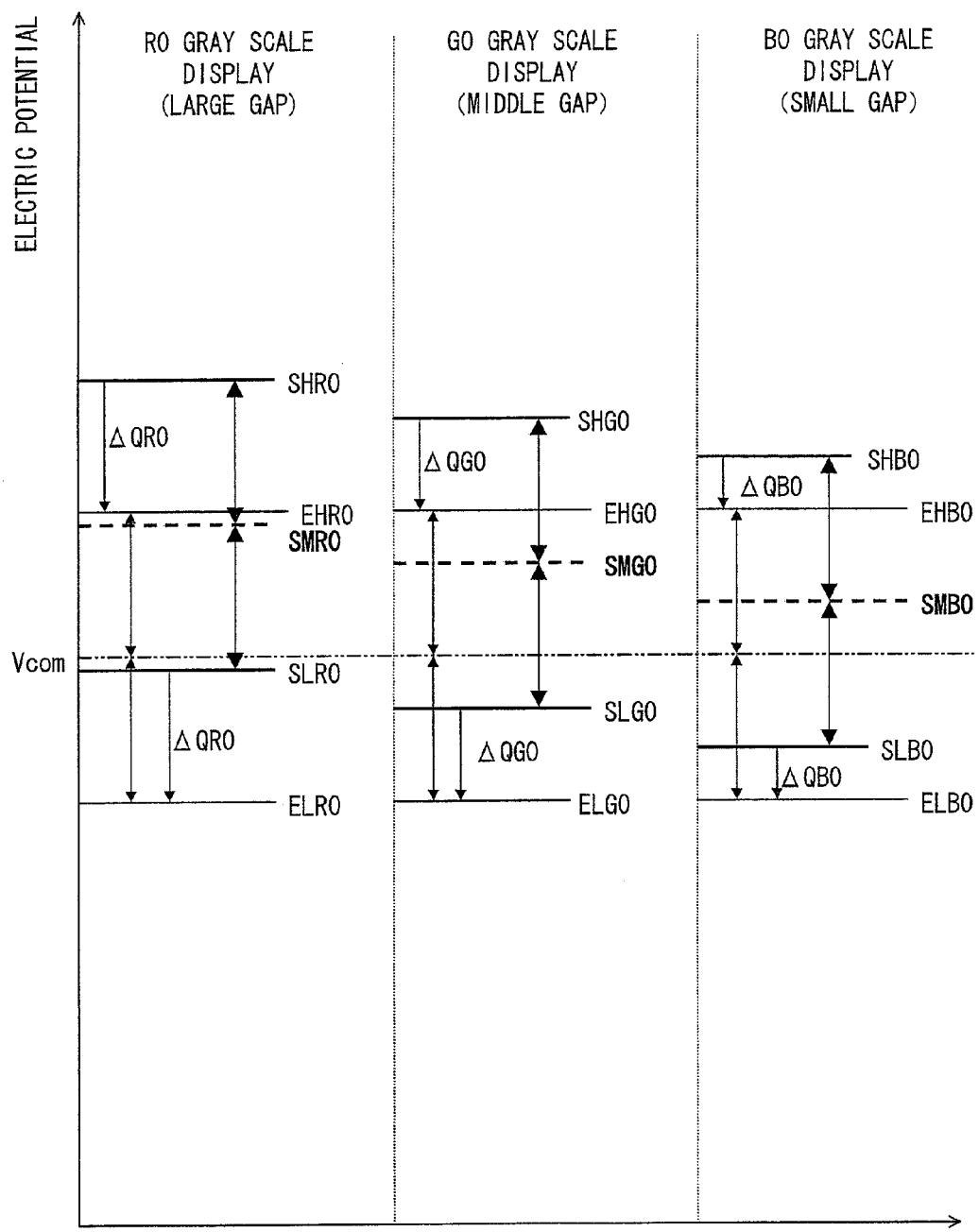
FIG. 7 is a schematic view illustrating another setting example (at 1023 gray scale=white gray scale display) of signal potentials in the present liquid crystal display device.

The RGB independent gamma setting is not essential, and is carried out in accordance with actual processes as appropriate. Namely, if it is possible to compensate the difference in retardation of the R, G, and B pixels (cause the three VT curves corresponding to respective R, G, and B pixels to coincide with each other) just by the setting of the liquid crystal layer (including the aspect of cost), no RGB independent gamma setting is required. In this case, for instance if 0 gray scale which is a black gray scale is to be displayed, the effective potentials (EHR0, ELR0) applied to R, the effective potentials (EHG0, ELG0) applied to G, and the effective potentials (EHB0, ELB0) applied to B coincide, as illustrated in FIG. 7.

Figures 8, 9:
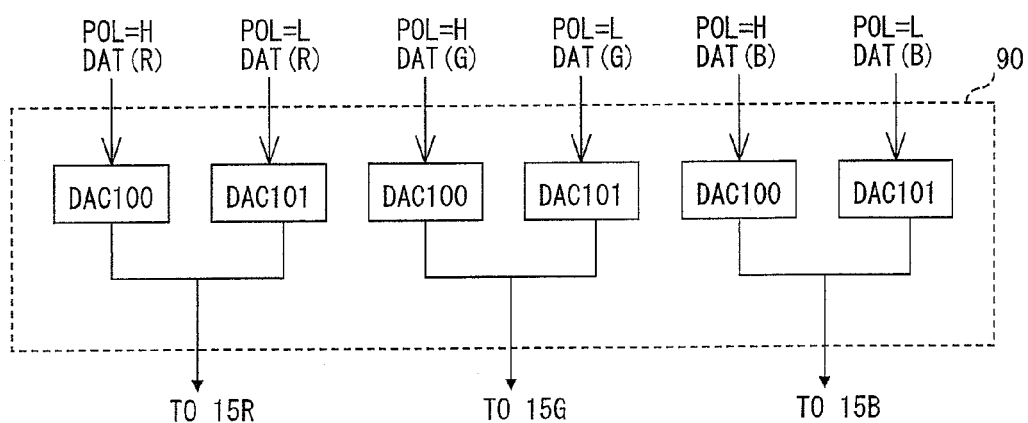
FIG. 8 is a table showing details of a LUT stored in a display control circuit of the present liquid crystal display device.
FIG. 9 is a schematic view illustrating a configuration (partially) of a source driver provided in the present liquid crystal display device.

FIG. 8 is a table showing a setting example of a LUT (Look-Up Table) included in the display control circuit 70. The display control circuit 70 generates a combination of a source polarity signal POL ("H" or "L") and an image data signal DAT (10 bits), with use of the digital video signal Dv and the LUT. The following description explains a case where input of the LUT is the gray scale of the digital video signal Dv, however the input of the LUT may be a gray scale of a digital signal obtained by carrying out a predetermined process to the digital video signal Dv.

For example, a combination of DAT of R having POL "H" and having 15 gray scale and a combination of DAT of R having POL "L" and having 0 gray scale are generated, based on a Dv having 0 gray scale of R (red). Moreover, a combination of DAT of G having POL "H" and having 13 gray scale and a combination of DAT of G having POL "L" and having 6 gray scale are generated, based on a Dv having 0 gray scale of G (green). Moreover, a combination of DAT of B having POL "H" and having 0 gray scale and a combination of DAT of B having POL "L" and having 9 gray scale are generated, based on a Dv having 0 gray scale of B (blue). Moreover, a combination of DAT of R having POL "H" and having 612 gray scale and a combination of DAT of R having POL "L" and having 402 gray scale are generated based on a Dv having 512 gray scale of R (red). Moreover, a combination of DAT of G having POL "H" and having 512 gray scale and a combination of DAT of G having POL "L" and having 512 gray scale are generated based on a Dv showing 512 gray scale of G (green). Moreover, a combination of DAT of B having POL "H" and having 364 gray scale and a combination of DAT of B having POL "L" and having 625 gray scale are generated based on a Dv having 512 gray scale of B (blue). Moreover, a combination of DAT of R having POL "H" and having 1023 gray scale and a combination of DAT of R having POL "L" and having 1015 gray scale are generated based on a Dv having 1023 gray scale of R (red). Moreover, a combination of DAT of G having POL "H" and having 1015 gray scale and a combination of DAT of G having POL "L" and having 1016 gray scale are generated based on a Dv showing 1023 gray scale of G (green). Moreover, a combination of DAT of B having POL "H" and having 1012 gray scale and a combination of DAT of B having POL "L" and having 1023 gray scale are generated based on a Dv showing 1023 gray scale of B (blue).

The source driver 90 outputs an analog voltage corresponding to respective gray scales. Hence, the gray scale data corrected by the LUT is converted into an analog voltage.

For example, when a setting of POL as "H" and of 15 gray scale is inputted into the source driver, the source driver outputs an analog positive signal potential SHR0 (see FIG. 5), and when a setting of POL as "L" and of 0 gray scale is inputted into the source driver, the source driver outputs an analog positive signal potential SHL0 (see FIG. 5).

FIG. 9 is a schematic view illustrating partially of a configuration example of the source driver 90. As illustrated in FIG. 9, the source driver 90 includes DAC 100 and DAC 101 that are connected to the data signal line 15R (red signal line), DAC 100 and DAC 101 that are connected to the data signal line 15G (green signal line), and DAC 100 and DAC 101 that are connected to the data signal line 15B (blue signal line).

The DAC 100 connected to the data signal line 15R receives the DAT of R in which POL is "H", the DAC 101 connected to the data signal line 15R receives the DAT of R in which POL is "L", the DAC 100 connected to the data signal line 15G receives the DAT of G in which POL is "H", the DAC 101 connected to the data signal line 15G receives the DAT of G in which POL is "L", the DAC 100 connected to the data signal line 15B receives the DAT of B in which POL is "H", and the DAC 101 connected to the data signal line 15B receives the DAT of B in which POL is "L".

Figures 10, 11:
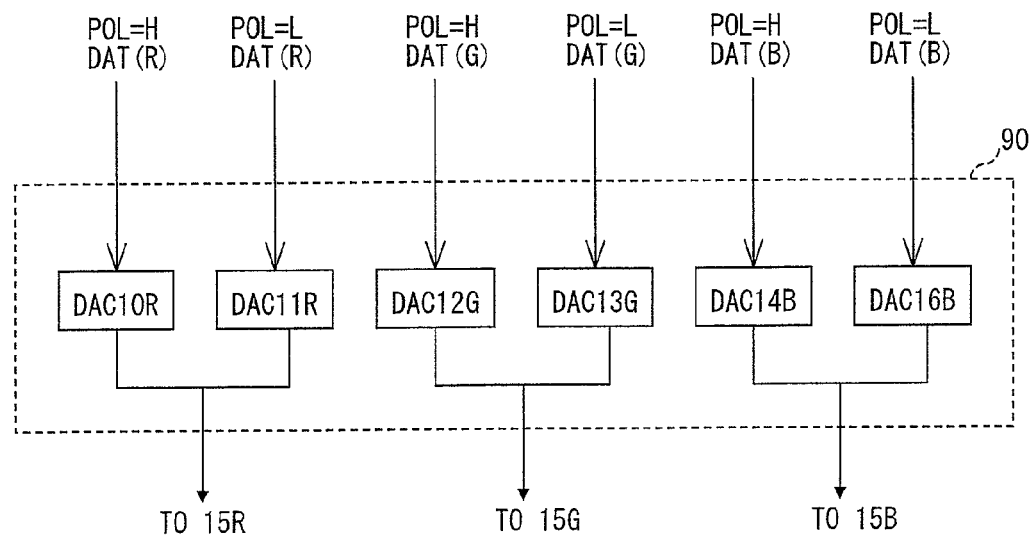
FIG. 10 is a table showing input and output of DAC circuits provided in the present liquid crystal display device.
FIG. 11 is a schematic view illustrating another configuration (partially) of a source driver provided in the present liquid crystal display device.

FIG. 10 is a table showing input and output (partially) of the DAC 100 and DAC 101 in FIG. 9. As shown in FIG. 10, upon receiving the digital image data signal DAT15, the DAC 100 outputs an analog positive signal potential SHR0 (see FIG. 5), and upon receiving the image data signal DAT612, the DAC 100 outputs the positive signal potential SHR512 (see FIG. 4). Upon receiving the image data signal DAT1023, the DAC 100 outputs the positive signal potential SHR1023 (see FIG. 1), and upon receiving the image data signal DAT13, the DAC 100 outputs the positive signal potential SHG0 (see FIG. 5), and upon receiving the image data signal DAT512, the DAC 100 outputs the positive signal potential SHG512 (see FIG. 4). Upon receiving the image data signal DAT1015, the DAC 100 outputs the positive signal potential SHG1023 (see FIG. 1), and upon receiving the image data signal DAT0, the DAC 100 outputs the positive signal potential SHB0 (see FIG. 5). Further, upon receiving the image data signal DAT364, the DAC 100 outputs the positive signal potential SHB512 (see FIG. 4), and upon receiving the image data signal DAT 1012, the DAC 100 outputs the positive signal potential SHB1023 (see FIG. 1).

On the other hand, the DAC 101, upon receiving the digital image data signal DAT0, outputs the analog negative signal potential SLR0 (see FIG. 5), and upon receiving the image data signal DAT402, outputs the negative signal potential SLR512 (see FIG. 4). Upon receiving the image data signal DAT1015, the DAC 101 outputs the negative signal potential SLR1023 (see FIG. 1), and upon receiving the image data signal DAT6, the DAC 101 outputs the negative signal potential SLG0 (see FIG. 5). Upon receiving the image data signal DAT512, the DAC 101 outputs the negative signal potential SLG512 (see FIG. 4), and upon receiving the image data signal DAT1016, the DAC 101 outputs the negative signal potential SLG1023 (see FIG. 1). Upon receiving the image data signal DAT9, the DAC 101 outputs the negative signal potential SLB0 (see FIG. 5), upon receiving the image data signal DAT 625, the DAC 101 outputs the negative signal potential SLB512 (see FIG. 4), and upon receiving the image data signal DAT1023, the DAC 101 outputs the negative signal potential SLB1023 (see FIG. 1).

As a result of the above, for example a display consecutively displaying two frames of a white gray scale (1023 gray scale) on an R pixel is carried out as follows. First, the display control circuit 70, based on a Dv having 1023 gray scale of R (red), generates the combination of DAT of R having POL "H" and having 1023 gray scale (see FIG. 8). This DAT of R having the 1023 gray scale is inputted into the DAC 100 connected to the data signal line 15R (see FIG. 9), and the positive signal potential SHR1023 is outputted to the data signal line 15R (see FIGS. 1 and 10). Subsequently, the display control circuit 70 generates the combination of DAT of R having the POL "L" and having 1015 gray scale (see FIG. 8), based on a Dv having 1023 gray scale of R (red); the DAT of R having the 1015 gray scale is inputted into the DAC 101 connected to the data signal line 15R (see FIG. 9), and a negative signal potential SLR1023 is outputted to the data signal line 15R (see FIGS. 1 and 10).

Moreover, a display consecutively displaying two frames of white gray scale (1023 gray scale) in a G pixel is carried out as follows. First, the display control circuit 70 generates the combination of DAT of G having POL "H" and having 1015 gray scale (see FIG. 8), based on a Dv having 1023 gray scale of G (green); the DAT of G having the 1015 gray scale is inputted into the DAC 100 connected to the data signal line 15G (see FIG. 9), and a positive signal potential SHG1023 is outputted to the data signal line 15G (see FIGS. 1 and 10). Subsequently, the display control circuit 70 generates a combination of DAT of G having POL "L" and having 1016 gray scale (see FIG. 8), based on a Dv having 1023 gray scale of G (green); the DAT of G having 1016 gray scale is inputted into the DAC 101 connected to the data signal line 15G (see FIG. 9), and the negative signal potential SLG1023 is outputted to the data signal line 15G (see FIGS. 1 and 10).

Moreover, a display consecutively displaying two frames of white gray scale (1023 gray scale) in a B pixel is carried out as follows. First, the display control circuit 70 generates a combination of the DAT of B having POL "H" and having 1012 gray scale, based on a Dv having 1023 gray scale of B (blue) (see FIG. 8). This DAT of B having 1012 gray scale is inputted into the DAC 100 connected to the data signal line 15B (see FIG. 9), and the positive signal potential SHB1023 is outputted to the data signal line 15B (see FIGS. 1 and 10). Subsequently, the display control circuit 70 generates the combination of the DAT of B having POL "L" and having 1023 gray scale, based on a Dv having 1023 gray scale of B (blue) (see FIG. 8). This DAT of B having the 1023 gray scale is inputted into the DAC 101 connected to the data signal line 15B (see FIG. 9), and a negative signal potential SLB1023 is outputted to the data signal line 15B (see FIGS. 1 and 10).

As described above, by having the display control circuit 70 have a LUT such as one shown in FIG. 8 and have the display control circuit 70 carry out gray scale conversion, it makes it possible to have two types of DAC (101 and 101) be provided in the source driver 90 as illustrated in FIG. 9. Since a general source driver has a configuration as illustrated in FIG. 9, it is possible to carry out signal potential settings in view of the feed-through voltage of the multigap structure as illustrated in FIG. 1 and FIGS. 4 to 7, by (a) additionally providing the display control circuit 70 with an LUT such as the one shown in FIG. 8, or in a case where the display control circuit includes an LUT, (b) modifying the details of the LUT to one as shown in FIG. 8 or (c) further adding a correcting LUT (so that an output of the correcting LUT becomes as one as shown in FIG. 8).

The present embodiment is not limited to one in which the gray scale conversion is carried out at the display control circuit 70, as described above. As an alternative, a DAC configuration of the source driver 90 may be modified. For instance, as illustrated in FIG. 11, six types (two types per R, G, and B pixels) of DAC are provided in the source driver 90. Namely, DAC 10R and DAC 11R are provided associated with the data signal line 15R, DAC 12G and DAC 13G are provided associated with the data signal line 15G, and DAC 14B and DAC 16B are provided associated with the data signal line 15B.

The display control circuit 70 generates a combination of a source polarity signal POL ("H" or "L") and an image data signal DAT (10 bit) in accordance with a received digital video signal Dv.

For example, based on a Dv having 0 gray scale of R (red), a combination of DAT of R having POL "H" and having 0 gray scale and a combination of DAT of R having POL "L" and having 0 gray scale are generated. Moreover, based on a Dv having 0 gray scale of G (green), a combination of DAT of G having POL "H" and having 10 gray scale and a combination of DAT of G having POL "L" and having 0 gray scale are generated. Moreover, based on a Dv having 0 gray scale of B (blue), a combination of DAT of B having POL "H" and having 0 gray scale and a combination of DAT of B having POL "L" and having 0 gray scale are generated. Moreover, based on a Dv having 512 gray scale of R (red), a combination of DAT of R having POL "H" and having 512 gray scale and a combination of DAT of R having POL "L" and having 512 gray scale are generated. Moreover, based on a Dv having 512 gray scale of G (green), a combination of DAT of G having POL "H" and having 512 gray scale and a combination of DAT of G having POL "L" and having 512 gray scale are generated. Moreover, based on a Dv having 512 gray scale of B (blue), a combination of DAT of B having POL "H" and having 512 gray scale and a combination of DAT of B having POL "L" and having 512 gray scale are generated. Moreover, a combination of DAT of R having POL "H" and having 1023 gray scale and a combination of DAT of R having POL "L" and having 1023 gray scale are generated, based on a Dv having 1023 gray scale of R (red). Moreover, a combination of DAT of G having POL "H" and having 1023 gray scale and a combination of DAT of G having POL "L" and having 1023 gray scale are generated, based on a Dv having 1023 gray scale of G (green). Moreover, a combination of DAT of B having POL "H" and having 1023 gray scale and a combination of DAT of B having POL "L" and having 1023 gray scale are generated, based on a Dv having 1023 gray scale of B (blue).

The DAC 10R connected to the data signal line 15R receives the DAT of R having the POL "H", and the DAC 11R connected to the data signal line 15R receives the DAT of R having the POL "L". The DAC 12G connected to the data signal line 15G receives the DAT of G having the POL "H", and the DAC 13G connected to the data signal line 15G receives the DAT of G having the POL "L". The DAC 14B connected to the data signal line 15B receives the DAT of B having the POL "H", and the DAC 16B connected to the data signal line 15B receives the DAT of B having the POL "L".

Figures 12, 13:
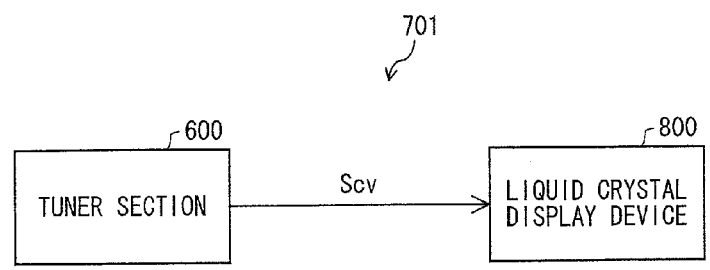
FIG. 12 is a table showing input and output of source drivers provided in the present liquid crystal display device.
FIG. 13 is a block diagram illustrating a configuration of the present television receiver.

FIG. 12 is a table showing input and output (partially) of the DAC 10R, 11R, 12G, 13G, 14B, and 16B of FIG. 11. As illustrated in FIG. 12, the DAC 10R outputs an analog positive signal potential SHR0 (see FIG. 5) upon receiving a digital image data signal DAT0, outputs a positive signal potential SHR512 (see FIG. 4) upon receiving an image data signal DAT512, and outputs a positive signal potential SHR1023 (see FIG. 1) upon receiving an image data signal DAT1023. Moreover, the DAC 11R outputs a positive signal potential SLR0 (see FIG. 5) upon receiving the digital image data signal DAT0, outputs a positive signal potential SLR512 (see FIG. 4) upon receiving the image data signal DAT512, and outputs a positive signal potential SLR1023 (see FIG. 1) upon receiving the image data signal DAT1023.

Moreover, the DAC 12G outputs a positive signal potential SHG0 (see FIG. 5) upon receiving a digital image data signal DAT0, outputs a positive signal potential SHG512 (see FIG. 4) upon receiving an image data signal DAT512, and outputs a positive signal potential SHG1023 (see FIG. 1) upon receiving an image data signal DAT1023. Moreover, the DAC 13G outputs the positive signal potential SLG0 (see FIG. 5) upon receiving the digital image data signal DAT0, outputs the positive signal potential SLG512 (see FIG. 4) upon receiving the image data signal DAT512, and outputs the positive signal potential SLG1023 (see FIG. 1) upon receiving the image data signal DAT1023.

Moreover, the DAC 14B outputs a positive signal potential SHB0 (see FIG. 5) upon receiving a digital image data signal DAT0, outputs a positive signal potential SHB512 (see FIG. 4) upon receiving an image data signal DAT512, and outputs a positive signal potential SHB1023 (see FIG. 1) upon receiving an image data signal DAT1023. Moreover, the DAC 16G outputs a positive signal potential SLB0 (see FIG. 5) upon receiving the digital image data signal DAT0, outputs a positive signal potential SLB512 (see FIG. 4) upon receiving the image data signal DAT512, and outputs a positive signal potential SLB1023 (see FIG. 1) upon receiving the image data signal DAT1023.

As a result of the above, for example a display consecutively displaying two frames of a white gray scale (1023 gray scale) in R pixels is carried out as follows. First, the display control circuit 70 generates the combination of DAT of R having POL "H" and having 1023 gray scale, based on Dv having 1023 gray scale of R (red). This DAT of R having 1023 gray scale is inputted into the DAC 10R connected to the data signal line 15R (see FIG. 11), and a positive signal potential SHR1023 is outputted to the data signal line 15R (see FIGS. 1 and 12). Subsequently, the display control circuit 70 generates the combination of the DAT of R having POL "L" and having 1023 gray scale (see FIG. 8), based on Dv showing 1023 gray scale of R (red). This DAT of R having 1023 gray scale is inputted into the DAC 11R connected to the data signal line 15R (see FIG. 11), and a negative signal potential SLR1023 is outputted to the data signal line 15R (see FIGS. 1 and 12).

As a result of the above, for example a display consecutively displaying two frames of a white gray scale (1023 gray scale) on a G pixel is carried out as follows. First, the display control circuit 70 generates the combination of DAT of G having POL "H" and having 1023 gray scale, based on a Dv having 1023 gray scale of G (green). This DAT of G having 1023 gray scale is inputted into the DAC 12G connected to the data signal line 15G (see FIG. 11), and the positive signal potential SHG1023 is outputted to the data signal line 15G (see FIGS. 1 and 12). Subsequently, the display control circuit 70 generates the combination of DAT of G having POL "L" and having 1023 gray scale, based on a Dv having 1023 gray scale of G (green). The DAT of G having the 1023 gray scale is inputted into the DAC 13G connected to the data signal line 15G (see FIG. 11), and the DAC 13G outputs a negative signal potential SLG1023 to the data signal line 15G (see FIGS. 1 and 12).

Moreover, a display consecutively displaying two frames of a white gray scale (1023 gray scale) on a B pixel is carried out as follows. First, the display control circuit 70 generates a combination of DAT of B having POL "H" and having 1023 gray scale, based on a Dv showing 1023 gray scale of B (blue). This DAT of B having the 1023 gray scale is inputted into the DAC 14B connected to the data signal line 15B (see FIG. 11), and a positive signal potential SHB1023 is outputted to the data signal line 15B (see FIGS. 1 and 12). Subsequently, the display control circuit 70 generates a combination of DAT of B having POL "L" and having 1023 gray scale, based on a Dv having 1023 gray scale of B (blue). The DAT of B having the 1023 gray scale is inputted into the DAC 16B connected to the data signal line 15B (see FIG. 11), and a negative signal potential SLB1023 is outputted to the data signal line 15B (see FIGS. 1 and 12).

In a case where an image based on television broadcast is displayed by the liquid crystal display apparatus 800, a tuner section 600 is connected to the liquid crystal display device 800 as illustrated in FIG. 13. The present television receiver 701 is configured as such. The tuner section 600 extracts signals of channels to be received among waves (high frequency signals) that are received by an antenna (not illustrated), and converts the extracted signals to intermediate frequency signals. By detecting this intermediate frequency signal, composite color video signals Scv as a television signal are taken out. The composite color video signal Scv is inputted into the liquid crystal display apparatus 800, and a digital video signal Dv obtained from the composite color video signal Scv is inputted into the display control circuit 70 (see FIG. 2).

FIG. 6 describes a case where the feed-through voltage of an identical pixel has gray scale dependence. Alternatively, in a case where the feed-through voltage has no gray scale dependence or in a case where the gray scale dependence can be ignored, regardless of the displayed gray scale, a middle value of the positive and negative signal potentials to be applied on the R pixels is a value adding $\Delta QR$ to Vcom, a middle value of the positive and negative signal potentials to be applied on the G pixels is a value adding $\Delta QG$ to Vcom, and the middle value SMBX of the positive and negative signal potentials to be applied on the B pixels is a value adding $\Delta QB$ to Vcom. Note that $\Delta QR$ is greater than $\Delta QG$, and $\Delta QG$ is greater than $\Delta QB$, so therefore the middle value of the positive and negative signal potentials applied on the R pixels becomes greater than the middle value of the positive and negative signal potentials applied on the G pixels, and the middle value of the positive and negative signal potentials applied on the G pixels is greater than the middle value of the positive and negative signal potentials applied on the B pixels.

Figure 14:
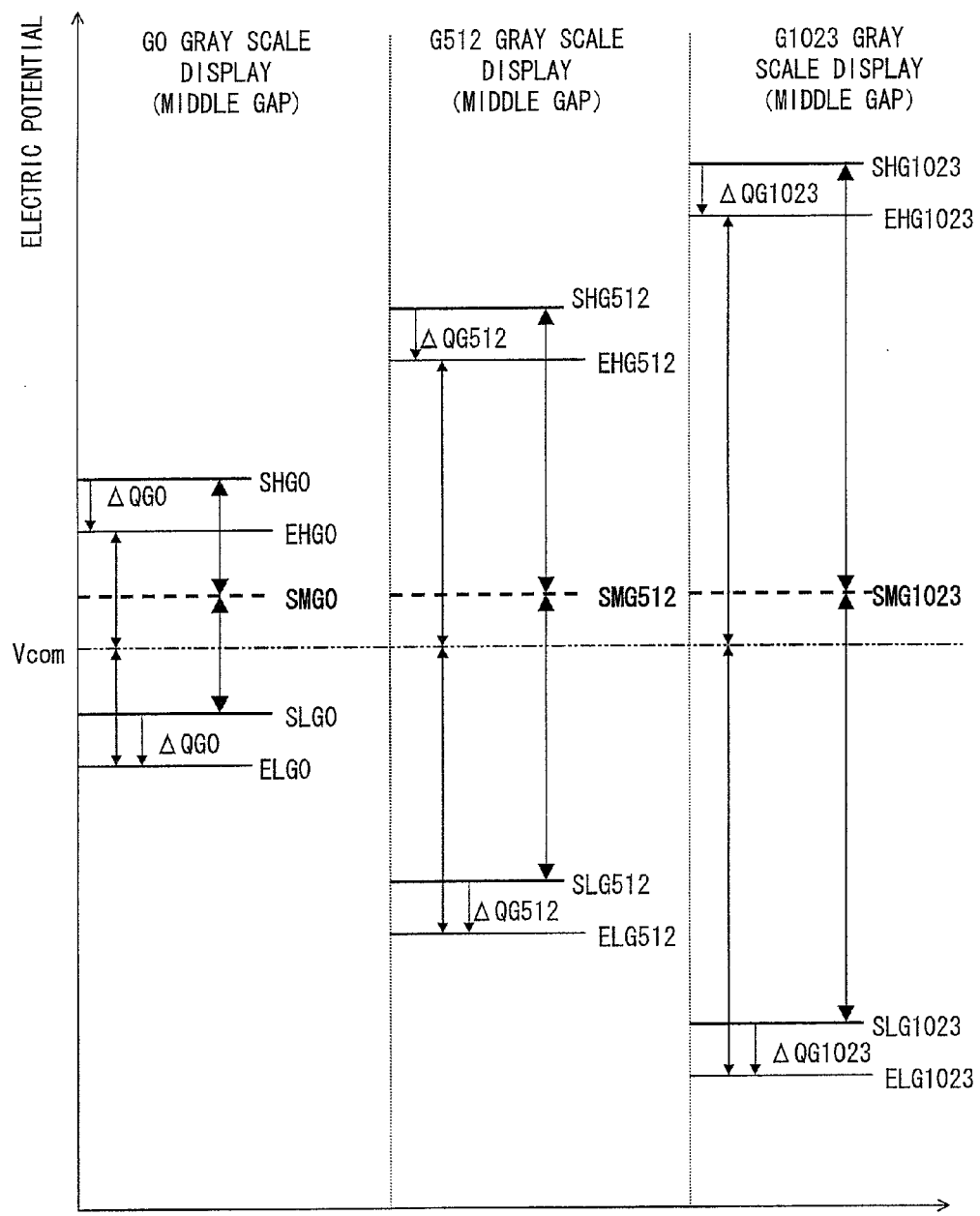
FIG. 14 is a schematic view illustrating a gray scale dependence (another example) of a signal potential middle value of the present liquid crystal display device.

FIG. 14 is a setting example of a signal potential at a time when 0, 512, or 1023 gray scale is to be displayed on the G pixels. In FIG. 14, SMG0 is equal to SMG512, which is also equal to SMG1023. In this case, SHR0 and SHB0 are set so that, for example, SHR0 (positive signal potential applied on the R pixels at 0 gray scale display)−SHG0=0.199 [V] and SHG0−SHB0 (positive signal potential applied on the B pixel at 0 gray scale display)=0.242 [V]. Similarly, SHR512 and SHB512 are set so that SHR512 (positive signal potential applied on R pixels at 512 gray scale display)−SHG512=0.199 [V] and SHG−SHB512 (positive signal potential applied on B pixels at 512 gray scale display)=0.242 [V]. Similarly, SHR1023 and SHB1023 are set so that SHR1023 (positive signal potential applied on R pixels at 1023 gray scale display)−SHG1023=0.199 [V] and SHG1023−SHB1023 (positive signal potential applied on B pixels at 1023 gray scale display)=0.242 [V].

Moreover, SLR0 and SLB0 are set so that SLR0 (negative signal potential applied on R pixels at 0 gray scale display)−SLG0=0.199 [V] and SLG0−SLB0 (negative signal potential applied on B pixels at 0 gray scale display)=0.242 [V]. Similarly, SLR512 and SLB512 are set so that SLR512 (negative signal potential applied on R pixels at 512 gray scale display)−SLG512=0.199 [V] and SLG512−SLB512 (negative signal potential applied on B pixels at 512 gray scale display) =0.242 [V]. Similarly, SLR1023 and SLB1023 are set so that SLR1023 (negative signal potential applied on R pixels at 1023 gray scale display)−SLG1023=0.199 [V] and SLG1023−SLB1023 (negative signal potential applied on B pixels at 1023 gray scale display)=0.242 [V].

Furthermore in this case, a difference of (i) a middle value SMR0 between SHR0 and SLR0 and (ii) a middle value SMG0 between SHG0 and SLG0 is 0.242 [V], and a difference between (i) a middle value SMB0 of SLB0 and SHB0 and (ii) the SMG0 is 0.199 [V]. Moreover, a difference between (i) a middle value SMR512 of SHR512 and SLR512 and (ii) a middle value SMG512 of SHG512 and SLG512 is 0.242 [V], and a difference between (i) the SMG512 and (ii) a middle value SMB512 of SHB512 and SLB512 is 0.199 [V]. Moreover, a difference between (i) a middle value SMR1023 of SHR1023 and SLR1023 and (ii) a middle value SMG1023 of SHG1023 and SLG1023 is 0.242 [V], and a difference between (i) the SMG1023 and (ii) a middle value SMB1023 of SHB1023 and SLB1023 is 0.199 [V].

Note that, even in a case of carrying out the setting as illustrated in FIG. 14, process may be carried out within the display control circuit 70 (e.g. perform gray scale conversion with use of LUT), or DAC configuration of the source driver 90 may be modified or a voltage correction circuit may be provided in the source driver 90.

Figure 17:
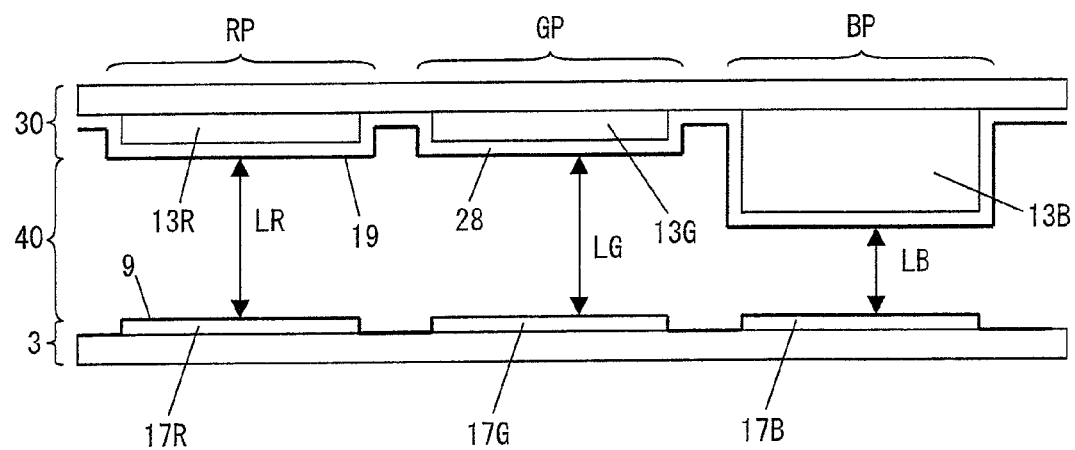
FIG. 17 is a cross sectional view of another liquid crystal panel according to the present embodiment.

If brightness of the G pixels remarkably decrease in a case where a thickness LG of the liquid crystal layer of the G pixel is reduced to a thickness thinner than a thickness LR of the liquid crystal layer of the R pixel as illustrated in FIG. 3, the thickness LR of the liquid crystal layer of the R pixels RP may be made of an equal thickness as with the thickness LG of the liquid crystal layer of the G pixels GP while the thickness LB of the liquid crystal layer of the B pixels BP is thinner than that of the two liquid crystal layers, as illustrated in FIG. 17 (just the liquid crystal layer of the B pixels is reduced in thickness). In a case where identical gray scales are to be continuously displayed for a predetermined period on each of the R pixels, G pixels, and B pixels, the signal potentials to be applied on the pixels may be set so that a middle value of the positive and negative signal potentials applied on the R pixels is of an equal value to a middle value of the positive and negative signal potentials applied on the G pixels, however a middle value of the positive and negative signal potentials applied on the B pixels is smaller than the other two middle values.

Figure 18:
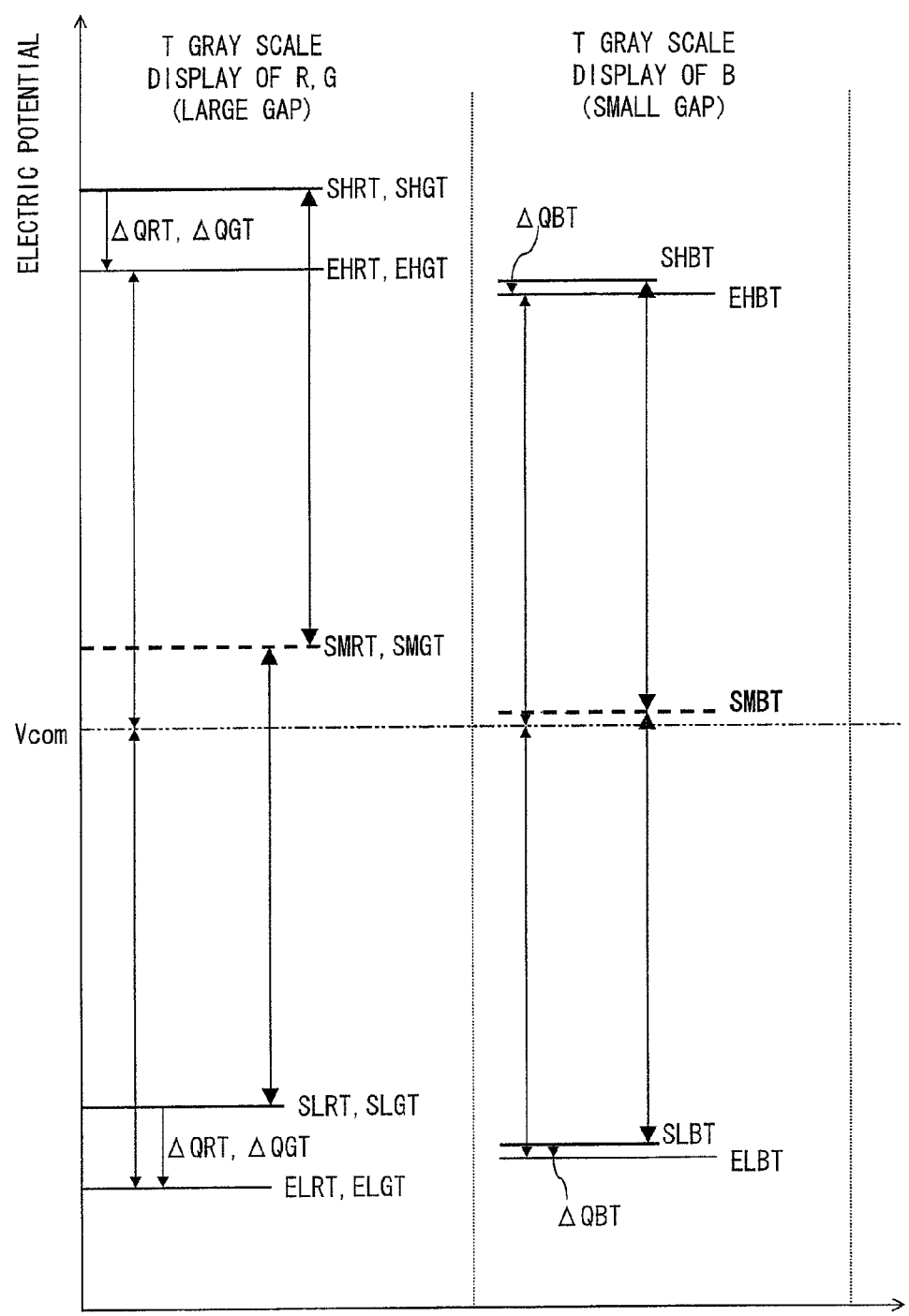
FIG. 18 is a schematic view illustrating a setting example (at T gray scale display) of signal potentials in a case where the liquid crystal panel of FIG. 17 is used.

More specifically, as illustrated in FIG. 18, the following signal potentials are set when a gray scale T is to be displayed, in view of achieving a feed-through voltage $\Delta$QRT of R pixels which is equal in value of a feed-through voltage $\Delta$QGT of G pixels, and a feed-through voltage $\Delta$QBT of B pixels which is smaller than the feed-through voltages $\Delta$QRT and $\Delta$QGT: a positive signal potential SHRT applied on the R pixels; a negative signal potential SLRT applied on the R pixels; a middle value SMRT of SHRT and SLRT; a positive signal potential SHGT applied on the G pixels; a negative signal potential SLGT applied on the G pixels; a middle value SMGT of SHGT and SLGT; a positive signal potential SHBT applied on B pixels; a negative signal potential SLBT applied on the B pixels; and a middle value SMBT of SHBT and SLBT.

Namely, in the R pixels, the positive signal potential SHRT=the positive effective electric potential EHRT+the feed-through voltage $\Delta$QRT, the negative signal potential SLRT=the negative effective electric potential ELRT+the feed-through voltage $\Delta$QRT, the counter electrode (common electrode) potential Vcom=a middle value of the positive and negative effective potentials=(EHRT+ELRT)/2, the middle value SMRT of the positive and negative signal potentials= (SHRT+SLRT)/2=Vcom+$\Delta$QRT. Moreover, in the G pixels, a positive signal potential SHGT=the positive effective electric potential EHGT+the feed-through voltage $\Delta$QGT, the negative signal potential SLGT=the negative effective electric potential ELGT+the feed-through voltage $\Delta$QGT, the counter electrode (common electrode) potential Vcom=the middle value of the positive and negative effective electric potentials=(EHGT+ELGT)/2, and the middle value SMGT of the positive and negative signal potentials=(SHGT+SLGT)/ 2=Vcom+$\Delta$QGT. Moreover, in the B pixels, the positive signal potential SHBT=the positive effective electric potential EHBT+the feed-through voltage $\Delta$QBT, the negative signal potential SLBT=the negative effective electric potential ELBT+the feed-through voltage $\Delta$QBT, the counter electrode (common electrode) potential Vcom=the middle value of positive and negative effective electric potentials=(EHBT+ ELBT)/2, and the middle value SMBT of the positive and negative signal potentials=(SHBT+SLBT)/2=Vcom+$\Delta$QBT. Hence, as illustrated in FIG. 18, SMRT, a value adding $\Delta$QRT to Vcom, is equal to SMGT that is a value adding $\Delta$QGT to Vcom, and SMBT that is a value adding $\Delta$QBT to Vcom is smaller than SMRT and SMGT.

The present embodiment is not limited in colors of pixels, to the three types of R, G, and B. This may be four types, R, G, B, and Y (yellow).

In this case, the wavelength of R is longer than that of Y, the wavelength of Y is longer than that of G, and the wavelength of G is longer than that of B. For instance, in a case where the thickness of the liquid crystal layer at the R pixels is thicker than that of Y pixels, the thickness of the liquid crystal layer at the Y pixels is thicker than that of G pixels, and further the thickness of the liquid crystal layer of G pixels is thicker than the thickness of the liquid crystal layer at the B pixels, and identical gray scales are to be displayed continuously for a predetermined period in each of the R pixels, Y pixels, G pixels, and B pixels, the signal potentials applied on the pixels may be set so that a middle value of positive and negative signal potentials applied on the R pixels is greater than a middle value of positive and negative signal potentials applied on the Y pixels, the middle value of the positive and negative signal potentials applied on the Y pixels is greater than a middle value of positive and negative signal potentials applied on G pixels, and the middle value of the positive and negative signal potentials applied on the G pixels is greater than a middle value of positive and negative signal potentials applied on the B pixels.

Figure 19:
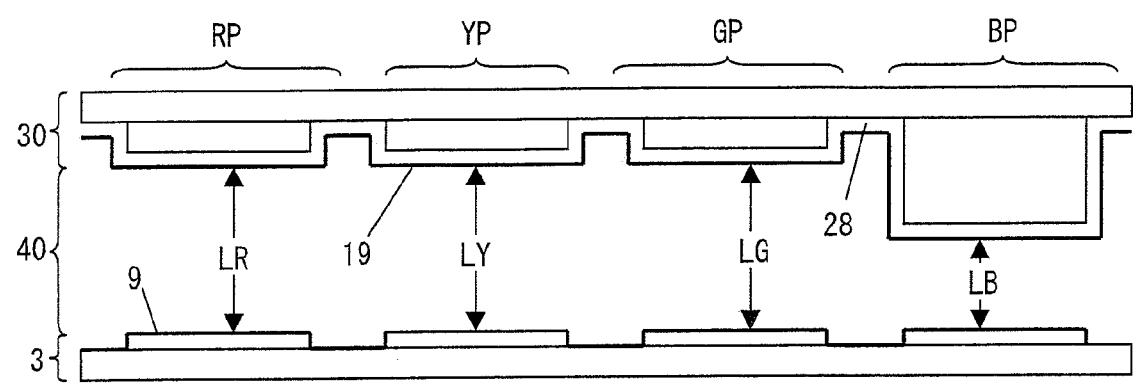
FIG. 19 is a cross sectional view illustrating yet another liquid crystal panel according to the present embodiment.

Moreover, in a case where (a) a thickness LR of the liquid crystal layer of the R pixels RP, a thickness LY of the liquid crystal layer of the Y pixel YP, and a thickness LG of the liquid crystal layer of the G pixel GP are of a same thickness, (b) a thickness LB of the liquid crystal layer of the B pixel BP is thinner than the thicknesses LR, LY, and LG, and (c) identical gray scales are to be displayed continuously for a predetermined period for each of the R pixels, Y pixels, G pixels, and B pixels, it is possible to set signal potentials applied on the pixels so that the middle value of the positive and negative signal potentials applied on the R pixels, the middle value of the positive and negative signal potentials applied on the Y pixels, and the middle value of the positive and negative signal potentials applied on the G pixels are of same values, and the middle value of the positive and negative signal potentials applied on the B pixels is smaller than the other middle values, as illustrated in FIG. 19.

Figure 20:
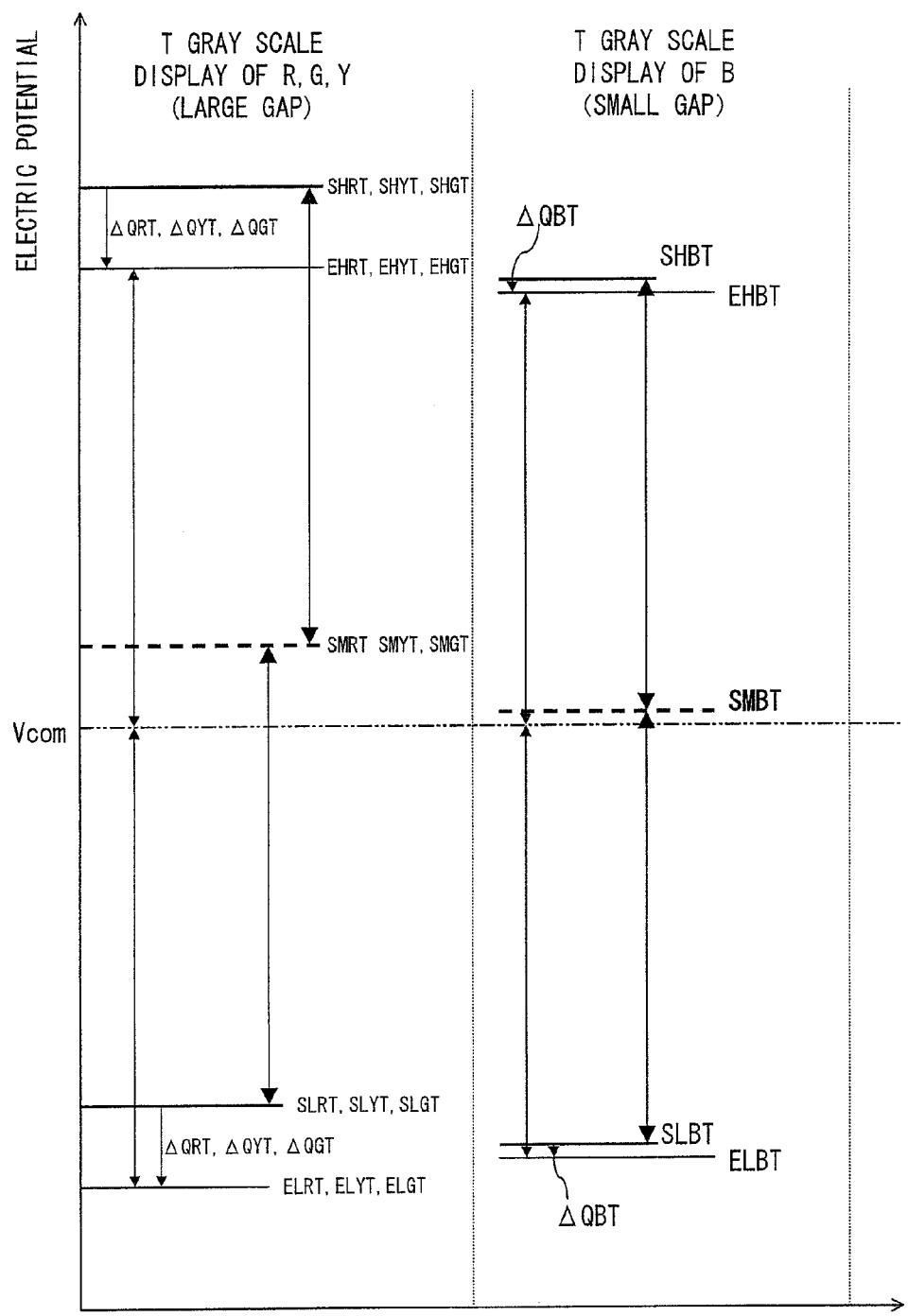
FIG. 20 is a schematic view illustrating a setting example (at T gray scale display) of signal potentials in a case where the liquid crystal panel of FIG. 19 is used.
Figure 21:
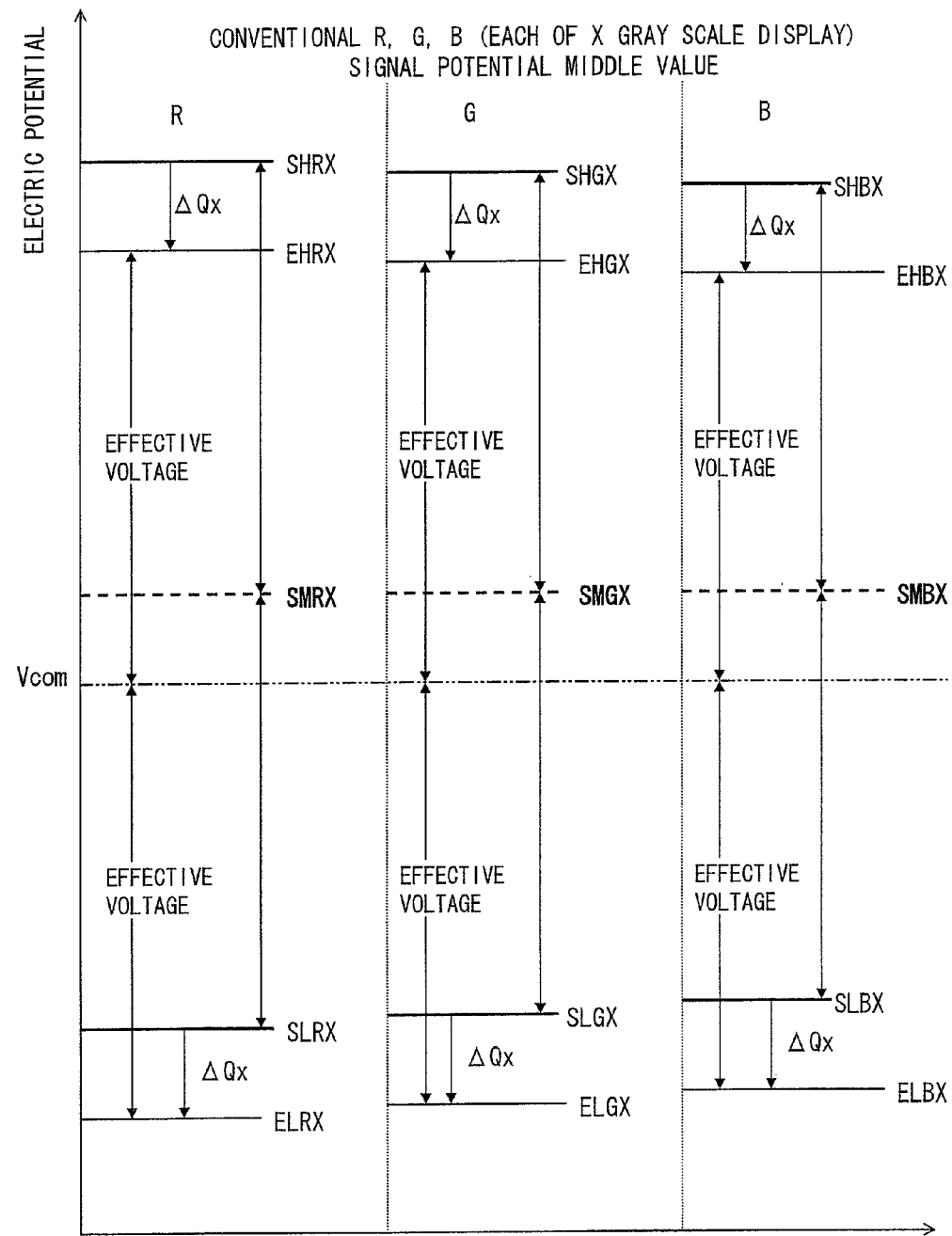
FIG. 21 is a schematic view illustrating how to set a signal potential middle value of R, G, and B pixels, in a non-multigap structure.

More specifically as illustrated in FIG. 20, when a gray scale T is to be displayed, the following signal potentials are set in view that the feed-through voltage $\Delta QRT$ of the R pixels, the feed-through voltage $\Delta QYT$ of the Y pixels, and the feed-through voltage $\Delta QGT$ of the G pixels become same voltages, meanwhile the feed-through voltage $\Delta QBT$ of the B pixels is smaller than those voltages $\Delta QRT$, $\Delta QYT$, and $\Delta QGT$: a positive signal potential SHRT applied on the R pixels; a negative signal potential SLRT applied on the R pixels; a middle value SMRT of SHRT and SLRT; a positive signal potential SHGT applied on the G pixels; a negative signal potential SLYT applied on the Y pixels; a middle value SMYT of SHYT and SLYT; a negative signal potential SLGT applied on the G pixels; a middle value SMGT of SHGT and SLGT; a positive signal potential SHBT applied on B pixels; a negative signal potential SLBT applied on B pixels; and a middle value SMBT of SHBT and SLBT.

Namely, in the R pixels, the positive signal potential SHRT=the positive effective potential EHRT+the feed-through voltage $\Delta QRT$, the negative signal potential SLRT=the negative effective potential ELRT+the feed-through voltage $\Delta QRT$, the counter electrode (common electrode) potential Vcom=a middle value of positive and negative effective potentials=(EHRT+ELRT)/2, and the middle value SMRT of positive and negative signal potentials=(SHRT+SLRT)/2=Vcom+$\Delta QRT$. Moreover, in the Y pixels, the positive signal potential SHYT=the positive effective potential EHYT+the feed-through voltage $\Delta QYT$, the negative signal potential SLYT=the negative effective potential ELYT+the feed-through voltage $\Delta QYT$, a counter electrode (common electrode) potential Vcom=the middle value of positive and negative effective electric potentials=(EHYT+ELYT)/2, and the middle value SMYT of positive and negative signal potentials=(SHYT+SLYT)/2=Vcom+$\Delta QYT$. Moreover, in the G pixels, the positive signal potential SHGT=the positive effective potential EHGT+the feed-through voltage $\Delta QGT$, the negative signal potential SLGT=the negative effective potential ELGT+the feed-through voltage $\Delta QGT$, the counter electrode (common electrode) potential Vcom=the middle value of positive and negative effective potentials=(EHGT+ELGT)/2, and the middle value SMGT of the positive and negative signal potentials=(SHGT+SLGT)/2=Vcom+$\Delta QGT$. Moreover, in the B pixels, the positive signal potential SHBT=the positive effective potential EHBT+the feed-through voltage $\Delta QBT$, the negative signal potential SLBT=the negative effective potential ELBT+the feed-through voltage $\Delta QBT$, the counter electrode (common electrode) potential Vcom=a middle value of positive and negative effective potentials=(EHBT+ELBT)/2, and the middle value SMBT of the positive and negative signal potentials=(SHBT+SLBT)/2=Vcom+$\Delta QBT$. Hence, as illustrated in FIG. 20, SMRT, which is a value of Vcom+$\Delta QRT$, is equal to SMYT that is a value of Vcom+$\Delta QYT$ and is further equal to SMGT that is a value of Vcom+$\Delta QGT$; meanwhile SMBT, which is a value of Vcom+$\Delta QBT$, is smaller than the values of SMRT, SMYT, and SMGT.

Moreover, there may be five pixel colors, R, G, B, Y (yellow), and C (cyan). In a case where five types of pixels of R, G, B, Y, and C are provided, the wavelength of R is greater than that of Y, the wavelength of Y is greater than that of G, the wavelength of G is greater than that of C, and the wavelength of C is greater than the wavelength of B. Hence, for example, in a case where the liquid crystal layers of the R, G, B, Y, and C pixels have such a thickness that the liquid crystal layer of R pixels is thicker than that of Y pixels, the thickness of the liquid crystal layer of Y pixels is thicker than that of G pixels, the thickness of the liquid crystal layer of G pixels is thicker than that of C pixels, and the thickness of the liquid crystal layer of C pixels is thicker than the thickness of liquid crystal layer of B pixels, and identical gray scales are to be displayed on each of the R pixels, Y pixels, G pixels, C pixels, and B pixels continuously for a predetermined period, the signal potentials applied on the pixels may be set so that a middle value of positive and negative signal potentials applied on the R pixels is greater than that of positive and negative signal potentials applied on the Y pixels, the middle value of positive and negative signal potentials applied on the Y pixels is greater than that of positive and negative signal potentials applied on the G pixels, the middle value of positive and negative signal potentials applied on the G pixels is greater than that of positive and negative signal potentials applied on C pixels, and the middle value of positive and negative signal potentials applied on C pixels is greater than the middle value of positive and negative signal potentials applied on the B pixels.

Moreover, the foregoing description explains a liquid crystal display device in which electric potential of a scanning signal line falls when the scanning signal line becomes not selected from a selected state (a scanning signal being "High" when active), however the liquid crystal display device may be one in which an electric potential of a scanning signal line rises when the scanning signal line becomes not selected from a selected state (the scanning signal being "Low" when active). However, with such a liquid crystal display device, electric potential of the pixel (pixel electrode) rises (rise voltage generates) when the transistor turns OFF (the scanning signal is deactivated). As a result, in a case where the thickness of the liquid crystal layer of the first pixel is thicker than the thickness of the liquid crystal layer of the second pixel, which thickness of the liquid crystal layer of the second pixel is thicker than the thickness of the liquid crystal layer of the third pixel, and identical gray scales are to be displayed on each of the first to third pixels continuously for a predetermined period, the signal potentials applied on the pixels are to be set so that the middle value of the positive and negative signal potentials applied on the first pixel is smaller than the middle value of the positive and negative signal potentials applied on the second pixel, which middle value of positive and negative signal potentials applied on the second pixel is smaller than the middle value of the positive and negative signal potential applied on the third pixel.

Although the foregoing description explains an image data signal to be inputted into the source driver so as to serve as the 10-bit data, it is needless to say that the data may be of other bit numbers.

A liquid crystal display device of the present invention includes: a plurality of scanning signal lines; a plurality of data signal lines; a first pixel including a first liquid crystal layer; a second pixel including a second liquid crystal layer, the second liquid crystal layer having a thickness of not more than that of the first liquid crystal layer; and a third pixel including a third liquid crystal layer, the third liquid crystal layer having a thickness thinner than that of the second liquid crystal layer, a scanning signal line decreasing in electric potential at a time when that scanning signal line is made unselected from a selected state, while each of the first to third pixels display identical gray scales continuously for a predetermined period, the first pixel being supplied alternately with a first positive signal potential and a first negative signal potential, the second pixel being supplied alternately with a second positive signal potential and a second negative signal potential, and the third pixel being supplied alternately with a third positive signal potential and a third negative signal potential, and a first middle value being set not less than a second middle value, and the second middle value being set more than a third middle value, the first middle value being a middle value (amplitude center) of the first positive signal potential and the first negative signal potential, the second middle value being a middle value (amplitude center) of the second positive signal potential and the second negative signal potential, and the third middle value being a middle value (amplitude center) of the third positive signal potential and the third negative signal potential.

With a liquid crystal display device having a multigap structure in which the thickness of the first liquid crystal layer is equal to or thicker than the thickness of the second liquid crystal layer and which the thickness of the second liquid crystal layer is thicker than the thickness of the third liquid crystal layer, the liquid crystal capacitor of the third pixel is greater than the liquid crystal capacitor of the second pixel, and the liquid crystal capacitor of the second pixel is equal to or greater than the liquid crystal capacitor of the first pixel. Hence, even when identical gray scales are displayed on the first to third pixels, the feed-through voltage of the first pixel is equal to or greater than the feed-through voltage of the second pixel, which feed-through voltage of the second pixel is greater than the feed-through voltage of the third pixel. Further, as described above with the first middle value being equal to or greater than the second middle value, which second middle value is greater than the third middle value, it is possible to compensate the difference of feed-through voltages between pixels, thereby allowing for improving problems such as image sticking of pixels and the like.

The present liquid crystal display device is configured in such a manner that the first liquid crystal layer is disposed between a pixel electrode included in the first pixel and a common electrode, the second liquid crystal layer is disposed between a pixel electrode provided in the second pixel and the common electrode, and the third liquid crystal layer is disposed between a pixel electrode provided in the third pixel and the common electrode, and each of the first to third middle values are set higher than an electric potential of the common electrode.

With the liquid crystal display device, the first middle value is a value in which a feed-through voltage of the first pixel at a time when the gray scale is displayed is added to the electric potential of the common electrode, the second middle value is a value in which a feed-through voltage of the second pixel at the time when the gray scale is displayed is added to the electric potential of the common electrode, and the third middle value is a value in which a feed-through voltage of the third pixel at the time when the gray scale is displayed is added to the electric potential of the common electrode.

With the present liquid crystal display device, the first pixel corresponds to a color having a wavelength longer than a wavelength of a color corresponding to the second pixel, and the wavelength of the color corresponding to the second pixel is longer than a wavelength of a color corresponding to the third pixel.

The liquid crystal display device may be configured in such a manner that the first pixel corresponds to red, the second pixel corresponds to green, and the third pixel corresponds to blue.

The present liquid crystal display device may be configured in such a manner that the first liquid crystal layer has a thickness equal to that of the second liquid crystal layer and the third liquid crystal layer has a thickness thinner than that of the first and second liquid crystal layers, and the first middle value is set to be equal to the second middle value and the third middle value is set to be smaller than the first and second middle values.

The present liquid crystal display device may be configured in such a manner that the first to third middle values are determined in accordance with the gray scale.

The present liquid crystal display device may be configured in such a manner that the first to third liquid crystal layers are of a VA mode.

The present liquid crystal display device may be configured further including: a fourth pixel including a fourth liquid crystal layer, the fourth liquid crystal layer having a thickness of not more than that of the first liquid crystal layer but not less than that of the second liquid crystal layer, while the fourth pixel also displays a gray scale identical to those of the first to third pixels continuously for a predetermined period, the fourth pixel being supplied alternately with a fourth positive signal potential and a fourth negative signal potential, and the first middle value being set not less than a fourth middle value that is a middle value of the fourth positive signal potential and the fourth negative signal potential, and the second middle value being set not more than the fourth middle value.

The present liquid crystal display device may be configured in such a manner that the first pixel corresponds to red, the second pixel corresponds to green, the third pixel corresponds to blue, and the fourth pixel corresponds to yellow.

The present liquid crystal display device may be configured in such a manner that the first liquid crystal layer, the second liquid crystal layer, and the fourth liquid crystal layer are equal in thickness, and the thickness of the third liquid crystal layer is thinner than the thicknesses of the first, second, and fourth liquid crystal layers, and the first middle value, the second middle value, and the fourth middle value are set to be equal to each other, and the third middle value is set to be smaller than the first, second, and fourth middle values.

A driving circuit of the present liquid crystal display device is a driving circuit for driving a liquid crystal display device, the liquid crystal display device including: a plurality of scanning signal lines; a plurality of data signal lines; a first pixel including a first liquid crystal layer; a second pixel including a second liquid crystal layer, the second liquid crystal layer having a thickness of not more than that of the first liquid crystal layer; and a third pixel including a third liquid crystal layer, the third liquid crystal layer having a thickness thinner than that of the second liquid crystal layer, a scanning signal line decreasing in electric potential at a time when that scanning signal line is made unselected from a selected state, while each of the first to third pixels display identical gray scales continuously for a predetermined period, the driving circuit supplying a first positive signal potential and a first negative signal potential alternately to the first pixel, a second positive signal potential and a second negative signal potential alternately to the second pixel, and a third positive signal potential and a third negative signal potential alternately to the third pixel, and a first middle value being set not less than a second middle value, and the second middle value being set more than a third middle value, the first middle value being a middle value of the first positive signal potential and the first negative signal potential, the second middle value being a middle value of the second positive signal potential and the second negative signal potential, and the third middle value being a middle value of the third positive signal potential and the third negative signal potential.

A driving method of the present liquid crystal display device is a method of driving a liquid crystal display device, the liquid crystal display device including: a plurality of scanning signal lines; a plurality of data signal lines; a first pixel including a first liquid crystal layer; a second pixel including a second liquid crystal layer, the second liquid crystal layer having a thickness of not more than that of the first liquid crystal layer; and a third pixel including a third liquid crystal layer, the third liquid crystal layer having a thickness thinner than that of the second liquid crystal layer, a scanning signal line decreasing in electric potential at a time when that scanning signal line is made unselected from a selected state, the method including: while each of the first to third pixels display identical gray scales continuously for a predetermined period, alternately supplying the first pixel with a first positive signal potential and a first negative signal potential, the second pixel with a second positive signal potential and a second negative signal potential, and the third pixel with a third positive signal potential and a third negative signal potential; and setting (i) a first middle value higher than a second middle value and (ii) the second middle value higher than a third middle value, the first middle value being a middle value of the first positive signal potential and the first negative signal potential, the second middle value being a middle value of the second positive signal potential and the second negative signal potential, and the third middle value being a middle value of the third positive signal potential and the third negative signal potential.

The present television receiver includes: the liquid crystal display device; and a tuner section configured to receive television broadcast.

The present invention is not limited to the description of the embodiments above, but may be altered by a skilled person within the scope of the claims. An embodiment based on a proper combination of technical means disclosed in different embodiments is encompassed in the technical scope of the present invention. Moreover, the effects described in the embodiments merely serve as exemplifications of the present invention.

A liquid crystal display device of the present invention and a driving circuit thereof are suitably used in, for example, a liquid crystal television and a liquid crystal monitor.

The invention claimed is:

1. A liquid crystal display device comprising:
a plurality of scanning signal lines;
a plurality of data signal lines;
a first pixel including a first liquid crystal layer;
a second pixel including a second liquid crystal layer, the second liquid crystal layer having a thickness of not more than that of the first liquid crystal layer; and
a third pixel including a third liquid crystal layer, the third liquid crystal layer having a thickness thinner than that of the second liquid crystal layer,
a scanning signal line decreasing in electric potential at a time when that scanning signal line is made unselected from a selected state,
while each of the first to third pixels display identical gray scales continuously for a predetermined period, the first pixel being supplied alternately with a first positive signal potential and a first negative signal potential, the second pixel being supplied alternately with a second positive signal potential and a second negative signal potential, and the third pixel being supplied alternately with a third positive signal potential and a third negative signal potential, and
a first middle value being set not less than a second middle value, and the second middle value being set more than a third middle value, the first middle value being a middle value of the first positive signal potential and the first negative signal potential, the second middle value being a middle value of the second positive signal potential and the second negative signal potential, and the third middle value being a middle value of the third positive signal potential and the third negative signal potential.

2. The liquid crystal display device according to claim 1, wherein the first liquid crystal layer is disposed between a pixel electrode included in the first pixel and a common electrode, the second liquid crystal layer is disposed between a pixel electrode provided in the second pixel and the common electrode, and the third liquid crystal layer is disposed between a pixel electrode provided in the third pixel and the common electrode, and
each of the first to third middle values are set higher than an electric potential of the common electrode.

3. The liquid crystal display device according to claim 2, wherein the first middle value is a value in which a feed-through voltage of the first pixel at a time when the gray scale is displayed is added to the electric potential of the common electrode, the second middle value is a value in which a feed-through voltage of the second pixel at the time when the gray scale is displayed is added to the electric potential of the common electrode, and the third middle value is a value in which a feed-through voltage of the third pixel at the time when the gray scale is displayed is added to the electric potential of the common electrode.

4. The liquid crystal display device according to claim 1, wherein the first pixel corresponds to a color having a wavelength longer than a wavelength of a color corresponding to the second pixel, and the wavelength of the color corresponding to the second pixel is longer than a wavelength of a color corresponding to the third pixel.

5. The liquid crystal display device according to claim 4, wherein the first pixel corresponds to red, the second pixel corresponds to green, and the third pixel corresponds to blue.

6. The liquid crystal display device according to claim 5, wherein the first liquid crystal layer has a thickness equal to that of the second liquid crystal layer and the third liquid crystal layer has a thickness thinner than that of the first and second liquid crystal layers, and the first middle value is set to be equal to the second middle value and the third middle value is set to be smaller than the first and second middle values.

7. The liquid crystal display device according to claim 1, wherein the first to third middle values are determined in accordance with the gray scale.

8. The liquid crystal display device according to claim 1, wherein the first to third liquid crystal layers are of a VA mode.

9. The liquid crystal display device according to claim 1, further comprising:
a fourth pixel including a fourth liquid crystal layer, the fourth liquid crystal layer having a thickness of not more than that of the first liquid crystal layer but not less than that of the second liquid crystal layer,
while the fourth pixel also displays a gray scale identical to those of the first to third pixels continuously for a predetermined period, the fourth pixel being supplied alternately with a fourth positive signal potential and a fourth negative signal potential, and
the first middle value being set not less than a fourth middle value that is a middle value of the fourth positive signal potential and the fourth negative signal potential, and the second middle value being set not more than the fourth middle value.

10. The liquid crystal display device according to claim 9, wherein the first pixel corresponds to red, the second pixel corresponds to green, the third pixel corresponds to blue, and the fourth pixel corresponds to yellow.

11. The liquid crystal display device according to claim 10, wherein the first liquid crystal layer, the second liquid crystal layer, and the fourth liquid crystal layer are equal in thickness, and the thickness of the third liquid crystal layer is thinner than the thicknesses of the first, second, and fourth liquid crystal layers, and the first middle value, the second middle value, and the fourth middle value are set to be equal to each other, and the third middle value is set to be smaller than the first, second, and fourth middle values.

12. A driving circuit for driving a liquid crystal display device, the liquid crystal display device including: a plurality of scanning signal lines; a plurality of data signal lines; a first pixel including a first liquid crystal layer; a second pixel including a second liquid crystal layer, the second liquid crystal layer having a thickness of not more than that of the first liquid crystal layer; and a third pixel including a third liquid crystal layer, the third liquid crystal layer having a thickness thinner than that of the second liquid crystal layer, a scanning signal line decreasing in electric potential at a time when that scanning signal line is made unselected from a selected state,
while each of the first to third pixels display identical gray scales continuously for a predetermined period, the driving circuit supplying a first positive signal potential and a first negative signal potential alternately to the first pixel, a second positive signal potential and a second negative signal potential alternately to the second pixel, and a third positive signal potential and a third negative signal potential alternately to the third pixel, and
a first middle value being set not less than a second middle value, and the second middle value being set more than a third middle value, the first middle value being a middle value of the first positive signal potential and the first negative signal potential, the second middle value being a middle value of the second positive signal potential and the second negative signal potential, and the third middle value being a middle value of the third positive signal potential and the third negative signal potential.

13. A method of driving a liquid crystal display device, the liquid crystal display device including: a plurality of scanning signal lines; a plurality of data signal lines; a first pixel including a first liquid crystal layer; a second pixel including a second liquid crystal layer, the second liquid crystal layer having a thickness of not more than that of the first liquid crystal layer; and a third pixel including a third liquid crystal layer, the third liquid crystal layer having a thickness thinner than that of the second liquid crystal layer, a scanning signal line decreasing in electric potential at a time when that scanning signal line is made unselected from a selected state,
the method comprising:
while each of the first to third pixels display identical gray scales continuously for a predetermined period, alternately supplying the first pixel with a first positive signal potential and a first negative signal potential, the second pixel with a second positive signal potential and a second negative signal potential, and the third pixel with a third positive signal potential and a third negative signal potential; and
setting (i) a first middle value higher than a second middle value and (ii) the second middle value higher than a third middle value, the first middle value being a middle value of the first positive signal potential and the first negative signal potential, the second middle value being a middle value of the second positive signal potential and the second negative signal potential, and the third middle value being a middle value of the third positive signal potential and the third negative signal potential.

14. A television receiver comprising:
a liquid crystal display device as set forth in claim 1; and
a tuner section configured to receive a television broadcast.

* * * * *